US012551790B2

(12) United States Patent
Takayanagi et al.

(10) Patent No.: US 12,551,790 B2
(45) Date of Patent: Feb. 17, 2026

(54) GAME SYSTEM, CONTROL METHOD THEREOF AND COMPUTER PROGRAM

(71) Applicant: Konami Digital Entertainment Co., Ltd., Tokyo (JP)

(72) Inventors: Yuya Takayanagi, Tokyo (JP); Shuhei Iwata, Tokyo (JP); Risa Takahashi, Tokyo (JP); Hayato Iwashita, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 292 days.

(21) Appl. No.: 18/339,210

(22) Filed: Jun. 21, 2023

(65) Prior Publication Data

US 2023/0398444 A1 Dec. 14, 2023

Related U.S. Application Data

(63) Continuation of application No. PCT/JP2021/038125, filed on Oct. 14, 2021.

(30) Foreign Application Priority Data

Dec. 25, 2020 (JP) ................................ 2020-217272

(51) Int. Cl.
*A63F 13/45* (2014.01)
*A63F 13/80* (2014.01)

(52) U.S. Cl.
CPC .............. *A63F 13/45* (2014.09); *A63F 13/80* (2014.09)

(58) Field of Classification Search
None
See application file for complete search history.

(56) References Cited

U.S. PATENT DOCUMENTS

2006/0217196 A1* 9/2006 Kikkawa ................. A63F 13/45 463/30
2008/0287175 A1* 11/2008 Kusuda ................. A63F 13/833 463/31
2018/0307760 A1* 10/2018 Wittke .................. G06F 16/735

FOREIGN PATENT DOCUMENTS

CN 204709764 U 10/2015
CN 111886055 A 11/2020

(Continued)

OTHER PUBLICATIONS

"TEPPEN" Strong players wanted! Quick Live Stream mainly of room matches: Tenth time, 4Gamer [online], Aug. 28, 2019, see particularly 52:37 to 55:35. [retrieved on Dec. 21, 2020], Internet <URL, https://www.youtube.com/watch?v=OTdPnXbw8Mk&feature=emb_logo> (1 page).

(Continued)

*Primary Examiner* — Ronald Laneau
(74) *Attorney, Agent, or Firm* — Sughrue Mion, PLLC

(57) ABSTRACT

A control method for causing a computer of a game system to execute a processing for presenting players a board face in which a media placement space including placement areas where the gaming media are to be placed is provided for each player and a correspondence relation is established between one placement area of each media placement space and one placement area of another media placement space, in a form in which the correspondence relation is perceivable, a procedure for giving each player an opportunity to place each of the gaming media in each placement area; and a procedure for calculating a result of the match between the gaming media based on a parameter of each gaming media placed between the placement areas between which the correspondence relation is established.

11 Claims, 15 Drawing Sheets

(56) References Cited

FOREIGN PATENT DOCUMENTS

| | | | |
|---|---|---|---|
| JP | 2002-065937 | A | 3/2002 |
| JP | 2003-175277 | A | 6/2003 |
| TW | I600455 | B | 10/2017 |
| TW | M576283 | U | 4/2019 |

OTHER PUBLICATIONS

[How to play Clash Royale], Clash Royale (ClaRoya) official [online], Mar. 15, 2016, see particularly 0:32 to 1:24, 2:29 to 4:36. [retrieved on Dec. 21, 2020], Internet <URL, https://www.youtube.com/watch?v=QoCRrG9wwp4> (1 page).

International Search Report dated Dec. 28, 2021, issued in International Application No. PCT/JP2021/038125.

Written Opinion dated Dec. 28, 2021, issued in International Application No. PCT/JP2021/038125.

"TEPPEN World Championship 2019—Full Event (EN Replay)", Youtube Image, 2020, <https://www.youtube.com/watch?v=4xSBelpYWh8>.

Office Action issued Jan. 16, 2025 in Korean Patent Application No. 10-2023-7020711.

Korean Office Action dated Sep. 25, 2025, issued in Korean application No. 10-2023-7020711.

Chinese Office Action dated Oct. 29, 2025 in Application No. 202180086623.3.

* cited by examiner

GAME SYSTEM, CONTROL METHOD THEREOF AND COMPUTER PROGRAM

BACKGROUND OF THE INVENTION

Field of the Invention

The present invention relates to a game system and the like for providing a type of game in which a match is fought by using gaming media.

Description of the Related Art

As a game system for providing a type of game in which a match is fought by using gaming media, there has been known a game system configured in such a manner that gaming media, such as cards or characters, are placed in a field according to instructions from players, and the gaming media are caused to fight against each other according to predetermined associations (for example, see Non Patent Literatures 1 and 2). As a game system that provides a game played by three or more players together, for example, there has been proposed a system that provides a game in which a predetermined number of cards are freely placed in squares in each player's own territory, one or more cards are moved according to a number on a dice, and winning and losing among the players are determined upon establishment of a condition that the player's own cards occupy an opponent's territory, or that the cards that any one player has in hand are used up (for example, see Patent Literature 1).

CITATION LIST

Patent Literature

Patent Literature 1
JP2002-065937A (see FIGS. 10, 12)

Non Patent Literature

Non Patent Literature 1
["TEPPEN" Strong players wanted! Quick Live Stream mainly of room matches: Tenth time, 4Gamer [online], Aug. 28, 2019, see particularly 52:37 to 55:35. [retrieved on Dec. 21, 2020], Internet <URL, https://www.youtube.com/watch?v=OTdPnXbw8Mk&feature=emb_logo>
Non Patent Literature 2
[How to play Clash Royale], Clash Royale (ClaRoya) official [online], Mar. 15, 2016, see particularly 0:32 to 1:24, 2:29 to 4:36. [retrieved on Dec. 21, 2020], Internet <URL, https://www.youtube.com/watch?v=QoCRrG9wwp4>

SUMMARY OF THE INVENTION

Technical Problem

The above-mentioned examples in Non Patent Literatures 1, 2 are limited to games in which two players fight a match. However, in forms for a two-player match, an opponent is limited to one player on the other side. Accordingly, there is a certain limit with respect to strategies that can be adopted by each player. In contrast, the example in Patent Literature 1 supposes a four-player match. However, each player can freely move cards along squares, and no restriction is imposed with respect to selection of a destination to which a card is moved. Accordingly, the number of strategic options is excessively large, so that there is a possibility of inconvenience, such as complicated selection lowering predictability related to progress in a game.

Accordingly, an object of the present invention is to provide a game system and the like that, when three or more players play a game together, can moderately restrain complexity in strategy selection while ensuring a reasonable degree of freedom related to strategies for a match.

Solution to Problem

A game system according to one aspect of the present invention is a game system comprising a computer for providing a game in which each of three or more players fights a match by using gaming media, and a parameter affecting a result of the match is set on each of the gaming media, wherein the computer is configured to serve as: a board face presentation unit configured to present, to each of the players via a predetermined display device, a board face on which a media placement space is provided for each player, the media placement space including a plurality of placement areas where the gaming media are to be placed, and a correspondence relation is established between one placement area in each media placement space and one placement area in at least one of the other media placement spaces, the board face being presented in a form in which the correspondence relation is perceivable; a placement opportunity giving unit configured to give each player an opportunity to place each of the gaming media in each placement area; and a match control unit configured to recognize, as participants in the match, the gaming media positioned between the placement areas between which the correspondence relation is established, to calculate the result of the match between the gaming media based on each of the parameters of the gaming media that are the participants in the match, and to change the parameters of the gaming media according to a result of the calculation.

A control method of a game system according to one aspect of the present invention is a control method of a game system comprising a computer for providing a game in which each of three or more players fights a match by using gaming media, and a parameter affecting a result of the match is set on each of the gaming media, wherein the control method causes the computer to execute: a procedure for presenting, to each of the players via a predetermined display device, a board face on which a media placement space is provided for each player, the media placement space including a plurality of placement areas where the gaming media are to be placed, and a correspondence relation is established between one placement area in each media placement space and one placement area in at least one of the other media placement spaces, the board face being presented in a form in which the correspondence relation is perceivable; a procedure for giving each player an opportunity to place each of the gaming media in each placement area; and a procedure for recognizing, as participants in the match, the gaming media positioned between the placement areas between which the correspondence relation is established, calculating the result of the match between the gaming media based on each of the parameters of the gaming media that are the participants in the match, and changing the parameters of the gaming media according to a result of the calculation.

A non-transitory storage medium according to one aspect of the present invention is a non-transitory storage medium storing a computer program applied to a game system comprising a computer for providing a game in which each of three or more players fights a match by using gaming media, and a parameter affecting a result of the match is set on each of the gaming media, wherein the computer program is configured to cause the computer to serve as: a board face presentation unit configured to present, to each of the players via a predetermined display device, a board face on which a media placement space is provided for each player, the media placement space including a plurality of placement areas where the gaming media are to be placed, and a correspondence relation is established between one placement area in each media placement space and one placement area in at least one of the other media placement spaces, the board face being presented in a form in which the correspondence relation is perceivable; a placement opportunity giving unit configured to give each player an opportunity to place each of the gaming media in each placement area; and a match control unit configured to recognize, as participants in the match, the gaming media positioned between the placement areas between which the correspondence relation is established, to calculate the result of the match between the gaming media based on each of the parameters of the gaming media that are the participants in the match, and to change the parameters of the gaming media according to a result of the calculation.

DESCRIPTION OF THE EMBODIMENTS

Hereinafter, a game system and the like according to an embodiment of the present invention are described with reference to the accompanying drawings.

[Entire Configuration]

Figure 1:
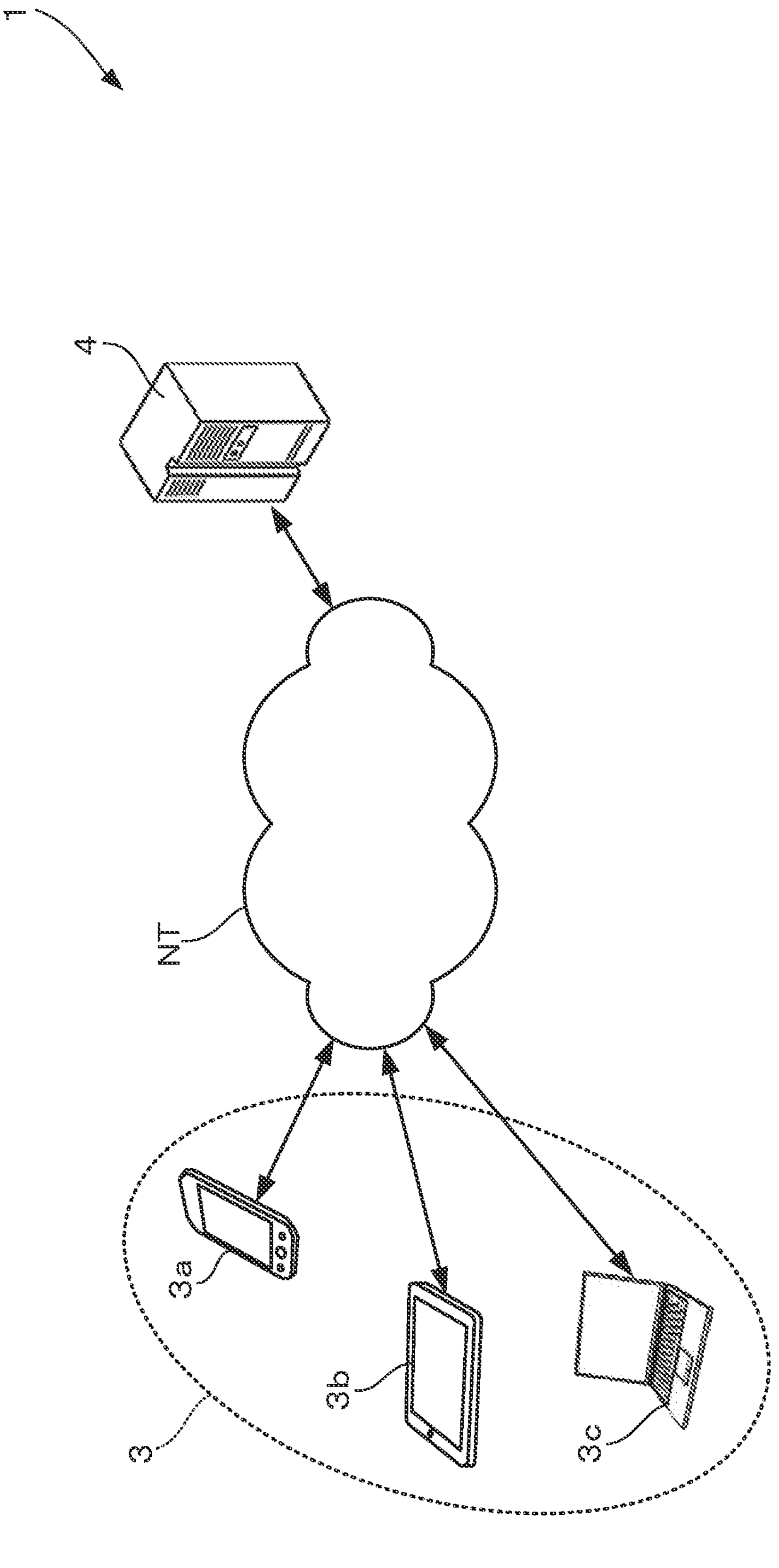
FIG. 1 is a perspective view showing an entire configuration of a game system according to an embodiment of the present invention.

First, an entire configuration of the game system is described with reference to FIG. 1. As shown in FIG. 1, the game system 1 is configured as a client-server system including a plurality of user devices 3 as clients, and a game server 4 connected to the user devices 3 through a network NT (as an example, the Internet).

Each user device 3 is a device for ordinary user uses, and is an information communication terminal device including a function for information communication through the network NT. As an example, a smartphone 3*a*, a tablet terminal 3*b*, or a PC (abbreviation for "personal computer") 3*c* including communication and telephone functions may be used for the user device 3. The user device 3 may be a stationary game device for personal or home use provided as a so-called consumer game console, or may be a game device for business use provided as a so-called arcade game machine. Incidentally, in the following description, a person who uses the user device 3 may be called "user", and when such a user plays a game, the user may be called "player" to make a distinction, in some cases.

The game server 4 may be configured by appropriately combining a plurality of server units or may be configured by using a single server unit. The game server 4 may be configured as a cloud server using cloud computing technology. The game server 4 provides the user devices 3 with various game-related services, such as a service of matching players who are to fight against each other in a game, a service of broadcasting game information to be shared among the user devices 3, and the like. Besides, a game device for business use or the like may be added to the game system 1 as appropriate. For example, the game device for business use may be used for a client that provides a game compatible with the user devices 3, or provides the same game as that is played on the user devices 3. Obviously, the game device for business use or the like may be used for a user device 3 for playing a game according to the present embodiment, as described above.

[Content of Game]

(1) Outline of Game

A game provided in the game system 1 includes an element that allows each of three or more players to fight a match by using a gaming medium. The gaming medium is a medium to be operated by a player to make progress in the game. For example, various elements configured as objects to be operated by a user in various games, such as a card, a character, an item, and a piece, may be used for gaming media. The gaming medium is not limited to a virtual medium appearing in a game screen, but may be provided to a player as a physical medium. For example, when a physical card is used for the gaming medium, information recorded on the card may be acquired by a user device 3, and a virtual gaming medium, such as a virtual card or character, corresponding to the physical card may be caused to appear in the game, based on the acquired information. The physical medium is not limited to a card in a flat plate shape, but may be a figure of solid shape or the like, and each user device 3 may be configured to able to acquire information related to a virtual gaming medium from the information recorded in the media, or acquire based on the information recorded therein. Incidentally, in the following, a description will be continued assuming that gaming media are virtual media, unless otherwise specified.

On each gaming medium, at least one type of parameter that affects a result of a match is set.

For example, a parameter, such as offensive power, defensive power, stamina, or a special capability, may be appropriately selected and set on the gaming medium. The value of the parameter changes according to a match, a game situation changes with the parameter value changes, and ultimate winning and losing are decided. A parameter may be further set on each player themselves. Thus, there may be a case where the opponent of the gaming medium operated by any one player is another player. The player is not limited to a real user who operates the user device 3. A group of players who play the game together may include, as part thereof, a computer-controlled virtual player.

(2) Description of Field

Figure 2:
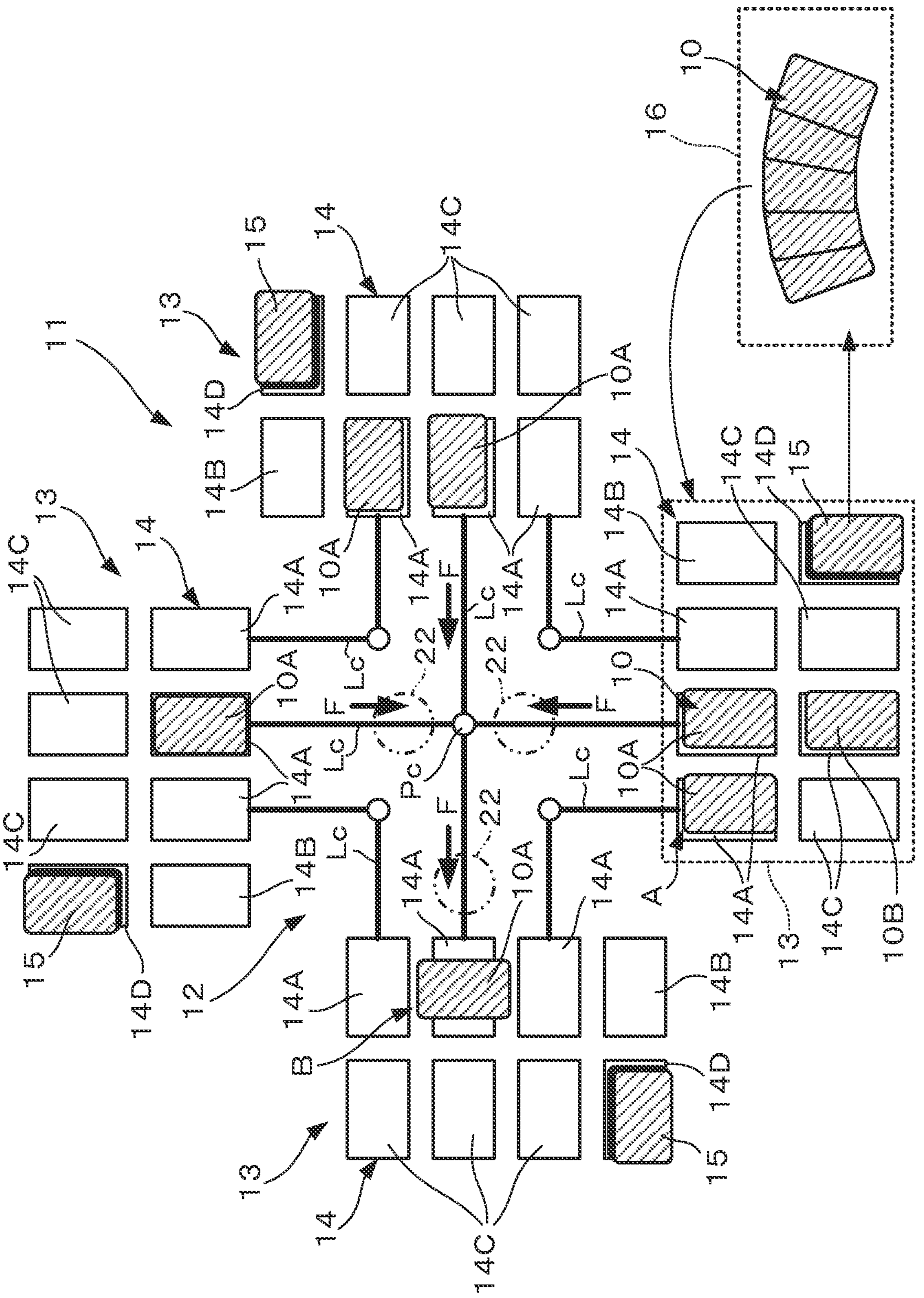
FIG. 2 is a diagram for describing an example of progress in a game.

FIG. 2 shows an example of progress in the game. In the example in FIG. 2, cards 10, as an example of the gaming media, and a field 11, as a place where the cards 10 are placed to progress the game, are used. The field 11 is an example of a board face. The board face is not limited to a two-dimensional flat configuration like the field 11, but may involve a three-dimensional shape. Four people are supposed as the number of players. The game progresses by appropriately putting the cards 10 in the field 11. A battle area 12 is configured in the field 11, and a card placement space 13, as an example of a media placement space, is configured for each player around the battle area 12. In the drawing, although the card placement space 13 corresponding to one player is indicated by a rectangle enclosed with a dotted line, the rectangle are not necessarily displayed in the game screen.

The battle area 12 serves as a place where a match takes place, and each card placement space 13 serves as a place indicating a territory of each player. In the example in FIG. 2, the four card placement spaces 13 in total are configured for the four players, respectively. Configurations and positions of the card placement spaces 13 are determined so as to present a state where the cards 10 are arranged in front of each player based on each player's point of view when it is assumed that the players are positioned so as to surround the battle area 12. In the following, with respect to the point of player's view, a near side may be referred to as a back side of the card placement space 13, and a far side (that is, a side near to the battle area 12) may be referred to as a front side of the card placement space 13, in some cases. The configuration of each card placement space 13 is mutually identical.

In each one card placement space 13, there are provided four types of card placement areas 14A, 14B, 14C, and 14D, as examples of a placement area where the gaming medium is to be placed. In FIG. 2, the cards 10 are indicated by hatched rectangles, and the card placement areas 14A to 14D are indicated by outlined rectangles. Layout of the cards 10 is an example. The cards 10 and the card placement areas 14A to 14D are displayed in the game screen. Incidentally, in the following description, suffixed letters A to D are used when it is necessary to make distinctions among types, and the expression "card placement area 14" is used when the card placement areas 14A to 14D are collectively referred to, without making distinctions among types. Eight card placement areas 14 are provided in each one card placement space 13 in such a manner as to make two separate rows in the front and back sides. In other words, four card placement areas 14 are arranged in one row, and two such rows are provided in the front and back sides, whereby the eight card placement areas 14 in total are provided in each card placement space 13. The card placement areas 14 are configured to be divided into a plurality of types according to functions and purposes of use in the game. In the depicted example, three from the left of the four card placement areas 14 in the front row are configured as monster card placement areas 14A, and the rightmost one is configured as a grave area 14B. Three from the left of the four card placement areas 14 in the back row are configured as special card placement areas 14C, and the rightmost one is configured as a deck area 14D.

Each of the monster card placement areas 14A is an area where a monster card 10A (see FIG. 3) is placed. The monster card 10A is used to cause a monster as a virtual character to appear, and is one type of the cards 10. A specific example of the monster card 10A will be described later. The grave area 14B is an area where the cards 10 that become unusable during the game is placed. For example, the card 10 with the value of a predetermined parameter falling below a lower-limit value as a result of losing a match (which will be described later) between monsters, and the like are placed in the grave area 14B. Each of the special card placement areas 14C is an area where a special card to which an effect for affecting a match is given separately from the monster card is placed. The deck area 14D is an area where a deck 15 to be used in the game is placed. The deck 15 is configured by collecting a predetermined number of cards 10 in a bundle, and is placed in the deck area 14D in a face-down state with back-face sides of the cards 10 facing up. The same appearance is applied to the back faces of all cards 10.

Correspondence relations are established between the monster card placement areas 14A in each card placement space 13 and any one monster card placement area 14A in each of the other players' card placement spaces 13. In FIG. 2, the correspondence relations are indicated by connecting the monster card placement areas 14A between which a correspondence relation is established by a line Lc. Moreover, an outlined circle on each line Lc in the drawing indicates a midpoint of the line Lc. In the example in FIG. 2, the correspondence relation between monster card placement areas 14A is established one-to-one. As an example, of the three monster card placement areas 14A in each card placement space 13, each of the rightmost and leftmost monster card placement areas 14A corresponds to the rightmost or leftmost monster card placement area 14A in the adjacent card placement spaces 13.

Furthermore, the monster card placement area 14A positioned in the middle corresponds to the middle monster card placement area 14A in an opposite card placement space 13. As a result, each of the monster card placement areas 14A corresponds to the monster card placement area 14A for one of the other mutually different players. However, as a result of the one-to-one correspondence relation between the middle monster card placement areas 14A, respective lines Lc indicating such correspondence relations intersect each other. The monster card placement areas 14A in such a relation of the lines Lc intersecting may be treated as specific placement areas between which no correspondence relation is established, or may be treated as specific placement areas between which the correspondence relation is established. In the latter case, with respect to the middle monster card area 14A, such area itself corresponds to a plurality of monster card placement areas 14A. In other words, a one-to-multiple correspondence relation is established.

The correspondence relation between the monster card placement areas 14A is established in order to limit combinations of the monster card placement areas 14A where the monster cards 10A that are to fight against each other in the game are to be placed. In other words, each combination of the monster cards respectively placed in the monster card placement areas 14A connected by a line Lc shown in FIG. 2 is to fight a match in the game, and a match does not take place between the other monster cards. Besides, when the one-to-multiple correspondence relation is established as described above, the combination of monster card placement areas 14A that is to fight a match is preferentially selected according to a predetermined condition. Incidentally, the number of monster card placement areas 14A and the correspondence relations shown in FIG. 2 are an example, and appropriate changes can be made. Modifications will be described later.

When the monster card is placed in the monster card placement area 14A, a corresponding monster 22 (see FIG. 4) appears on the monster card placement area 14A. The monster 22 moves forward along the relevant line Lc as indicated by an arrow F in the drawing, according to progress in the game, and a match occurs depending on a position of the monster 22.

Moreover, a hand area 16 is configured for each player, in vicinity of the card placement space 13. The hand area 16 is an area for presenting, to the player, a predetermined number of cards 10 as cards in hand that the player acquires from the deck 15. In the hand area 16, the cards 10 are displayed in a state where the front faces thereof, that is, the faces on a side where contents of the cards 10 are displayed, are exposed. The hand area 16 for each player is displayed in a form in which the hand area 16 is not displayed to the other players, or even if displayed, the contents of the cards 10 are unrecognizable, to the other players. In the game, the cards 10 are taken from the deck 15 into the hand area 16, and an appropriate card 10 is placed in the card placement area 14, according to the player's operation.

(3) Description of Card

Figure 3:
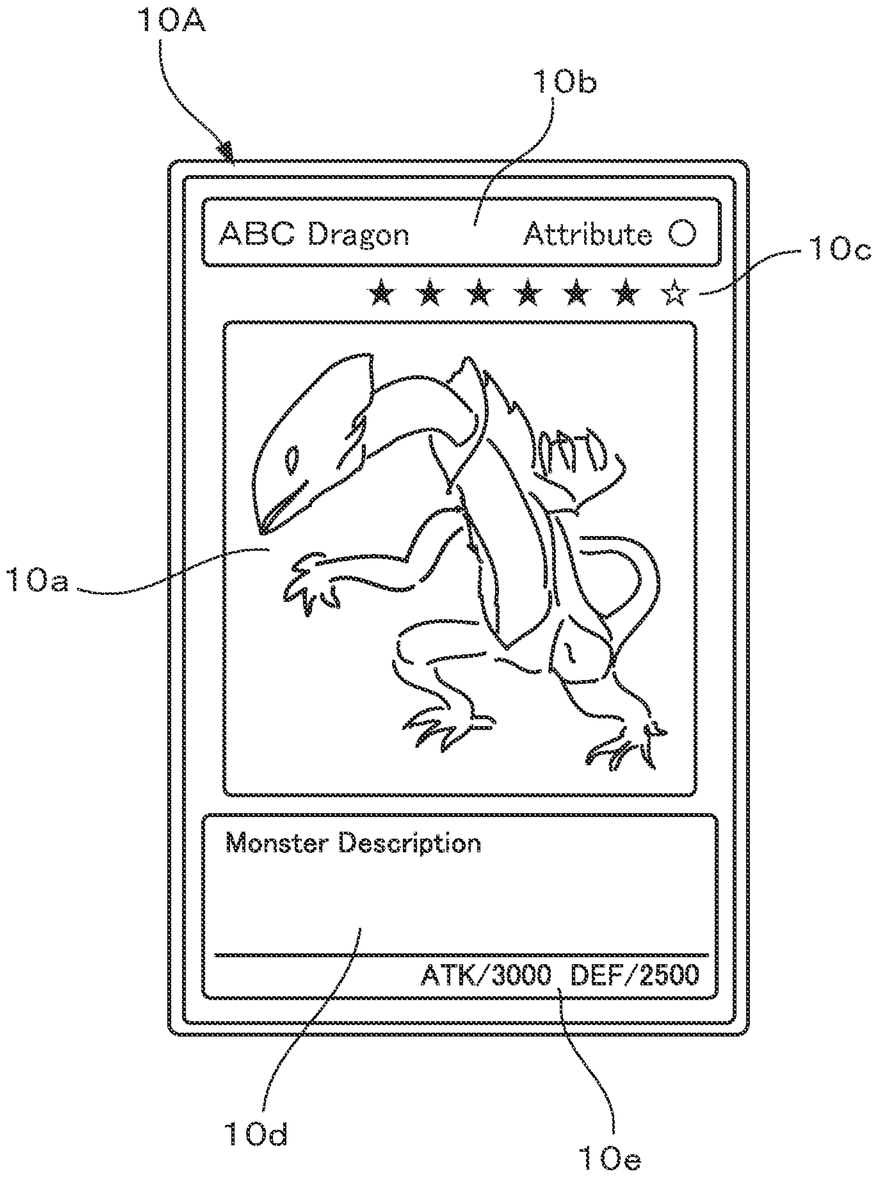
FIG. 3 shows an example of a card used in the game.

FIG. 3 shows an example of the monster card. The monster card 10A includes an image part 10*a* where an image of a monster is placed, a title part 10*b* where a name and an attribute of the monster is displayed, a level display part 10*c* where a level of the monster is displayed, a comment part 10*d* where a description, abilities, and the like of the monster are described, and a parameter display part 10*e* where a value of a parameter set on the monster is displayed. The monster displayed in the image part 10*a* is a virtual character that emerges from the monster card 10A and that is for directing a scene of a fight with another monster while moving forward along the line Lc in the field 11. In other words, in the game, the monster cards 10A placed in monster card placement areas 14A, between which an correspondence relation is established, are configured as participants in the match, and the monsters appear as characters for presenting actions related to the match. Accordingly, the match between the monster cards 10A is synonymous with the match between the monsters. In the game, various monsters are prepared beforehand, and any one monster is selected from among the monsters and is assigned to the monster card 10A. In the title part 10*b*, the name and the attribute of the monster assigned to the image part 10*a* is displayed. The attribute is a concept to be classified, for example, as a concept such as "darkness", "light", or "water", and can be used as one type of parameters that affects congeniality and the like between the monsters in the match. However, use of the attribute in the game is not essential.

The level display part 10*c* is configured to indicate how high or low the level of the monster is, by using the number of stars.

The level of the monster is also one type of the parameters set on the card 10, in terms of affecting progress in the game. The level may be used for an appropriate purpose. As an example, the level may be used in association with a condition that restricts placement of the monster card 10A in the monster card placement area 14A. For example, the monster card 10A with level 4 (four stars) or lower can be unconditionally placed in any of the monster card placement areas 14A that is empty. The monster card 10A with level 5 or 6 can be placed in the monster card placement area 14A in exchange for moving one monster card 10A placed in the monster card placement area 14A to the grave area 14B. The monster card 10A with level 7 can be placed in the monster card placement area 14A in exchange for moving two monster cards 10A placed in the monster card placement area 14A to the grave area 14B. However, irrespective of such examples of use, the level may be used for various purposes, such as superiority or inferiority in the match.

In the parameter display part 10*e*, values of "offensive power" and "defensive power", which are types of the parameters set on the monster card 10A, are displayed as a value of "ATK" and a value of "DEF", respectively. The respective values of the offensive power and the defensive power are used differently, according to a form in which the monster card 10A is placed. Specifically, as shown in FIG. 2, for placement of the monster card 10A, the player can select any one of the following forms: a longitudinal-placement form in which the monster card 10A is placed in the monster card placement area 14A in a direction in which a long-side direction of the monster card 10A coincides with a front-back direction of the card placement space 13 (see portion A in FIG. 2); and a lateral-placement form in which the monster card 10A is placed in the monster card placement area 14A in a direction in which a short-side direction of the monster card 10A coincides with the front-back direction of the card placement space 13 (see portion B in FIG. 2). In case of a monster card 10A placed in the longitudinal-placement form, the value of the offensive power is used in calculation of a result of the match, and in case of a monster card 10A placed in the lateral-placement form, the value of the defensive power is used in calculation of the result of the match. The calculation of the result of the match will be described later.

As is obvious from the field 11 in FIG. 2, among the cards 10, special cards 10B are prepared in addition to the monster cards 10A. The special cards 10B may be distinguished from the monster cards 10A, for example, by using an appropriate name such as magic card or trap card. Among the special cards 10B, a type of the special cards 10B may be provided that does not need to be placed in the card placement space 13 and can be used at an appropriate timing if, for example, the special card 10B is included among the cards 10 in the hand area 16 (that is, the cards in hands), in addition to a type that is used by being placed in the special card placement area 14C in the card placement space 13. An effect of the special card can be appropriately set as long as the special card affects progress in the game or the match between the monsters, such as an effect of recovering the offensive power, the defensive power set on the player's own monster card 10A, an effect of reducing the offensive power or the like of the opponent's monster card 10A, an effect of reviving the card 10 in the grave area 14B, an effect of changing the placement form of the opponent's monster card 10A between the longitudinal-placement form and the lateral-placement form, or an effect of exerting an impact on the entire field 11. There are examples where such special effects are prepared in various card games, and effects of the special cards 10B may be set according thereto.

(4) Game Screen

Figure 4:
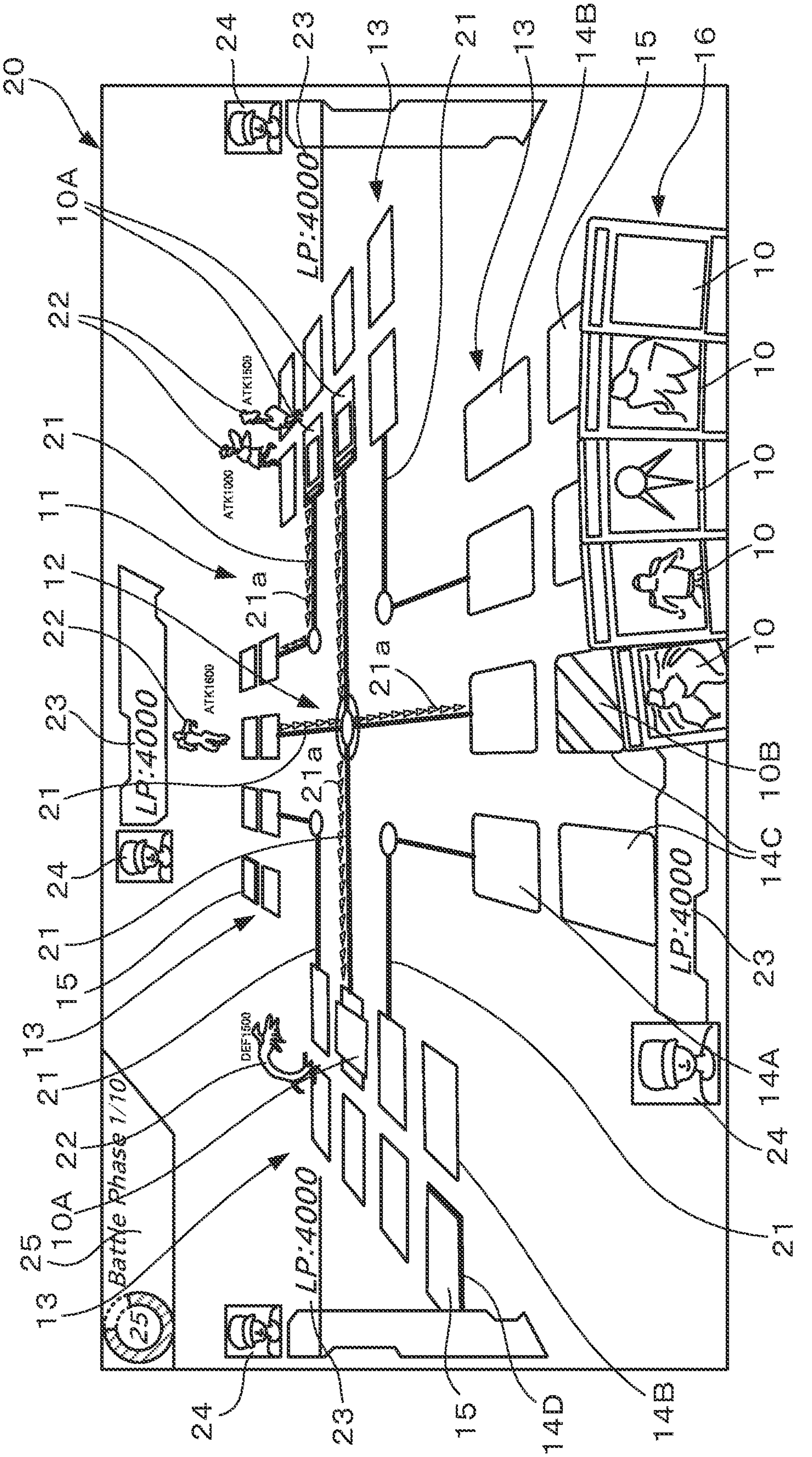
FIG. 4 shows an example of a game screen displayed on a user device.

An example of the game screen corresponding to the field 11 in FIG. 2 is shown in FIG. 4. Incidentally, in FIG. 4, reference signs are shown, with some thereof omitted as deemed appropriate. The game screen 20 in FIG. 4 represents an aspect in which the field 11 is observed from a viewpoint of the player of the user device 3. In the game screen 20, displayed are: the eight card placement areas 14 provided in each card placement space 13; line images 21 as examples of an image element representing a line Lc connecting the monster card placement areas 14A between which the correspondence relation is established; and images of the cards 10 included in the player's own hand area 16 and the cards 10 placed in the card placement areas 14. The line images 21 may be displayed in any of various forms as long as each line Lc can be perceived by the player. In FIG. 4, the line Lc itself is displayed as the line image 21, and the whole of the line image 21 may be displayed constantly, or may be displayed in a form involving scrolling, blinking, or any other dynamic changing. The line Lc may be presented by configuring the line image 21 so as to arrange image elements, such as a plurality of arrows, along the line Lc. For example, in FIG. 4, with respect to each line Lc on which a monster 22 appears, an indicator 21*a* configured by concatenating a plurality of triangular symbols is displayed as part of the line image 21. As described above, the line image 21 may be configured in an appropriate form as long as the line Lc connecting monster card placement areas 14A can be reminded. The line image 21 does not necessarily need to be displayed in such a manner as to linearly connecting the monster card placement areas 14A between which the correspondence relation is established. The line image 21 may be displayed as a curve or in any of other various forms. Each line image 21 is displayed as an example of an image element that is displayed to allow the player to perceive the correspondence relation between the monster card placement areas 14A. As long as such a purpose can be achieved, representation of the correspondence relation between the monster card placement areas 14A is not necessarily limited to the example in which the line Lc is displayed in a form perceivable to the player. For example, an image to allow the correspondence relation to be perceived may be displayed in an appropriate form, such as a form in which the monster card placement areas 14A between which the correspondence relation is established are presented in the same color or pattern, or are enclosed by frame lines.

With respect to the monster card 10A placed in the monster card placement area 14A, the image of the monster 22 that is to be appeared in connection with the monster card 10A is also displayed in the game screen 20. The image of the monster 22 may be accompanied by information that is helpful in the match. In FIG. 4, an example is shown in which the value of the offensive power and the value of the defensive power are displayed along with a monster 22 that is an attacker, and a monster 22 that is a defender, respectively. The monster 22 moves along the relevant line Lc in the battle area 12, according to progress in the game, and fights against another player's monster 22 positioned on the same line Lc when a predetermined condition for the match is satisfied. In addition, in the game screen 20, a parameter display part 23 indicating the parameters such as stamina value and life set on each player is displayed in association with a player image 24 representing the player. Further, a phase information display part 25 indicating a state of progress in a competition is provided at an appropriate position, as an example, an upper-left position, in the game screen 20. In the phase information display part 25, shown as information indicating the state of progress are: information indicating whether the competition is in a strategy phase or in a battle phase (the battle phase, in the depicted example); information indicting the number of turns (the first of ten turns, which is indicated as "1/10", in the depicted example); and remaining time in the phase (25 seconds, in the depicted example). Incidentally, a viewpoint from which the field 11 is observed does not necessarily need to be the viewpoint of the player. An image of the field 11 observed from an appropriate viewpoint may be displayed as the game screen 20. The game screen 20 may be displayed while the viewpoint is appropriately changed according to the player's operation, with passage of time, or the like.

(5) Progress in Game

Figure 5:
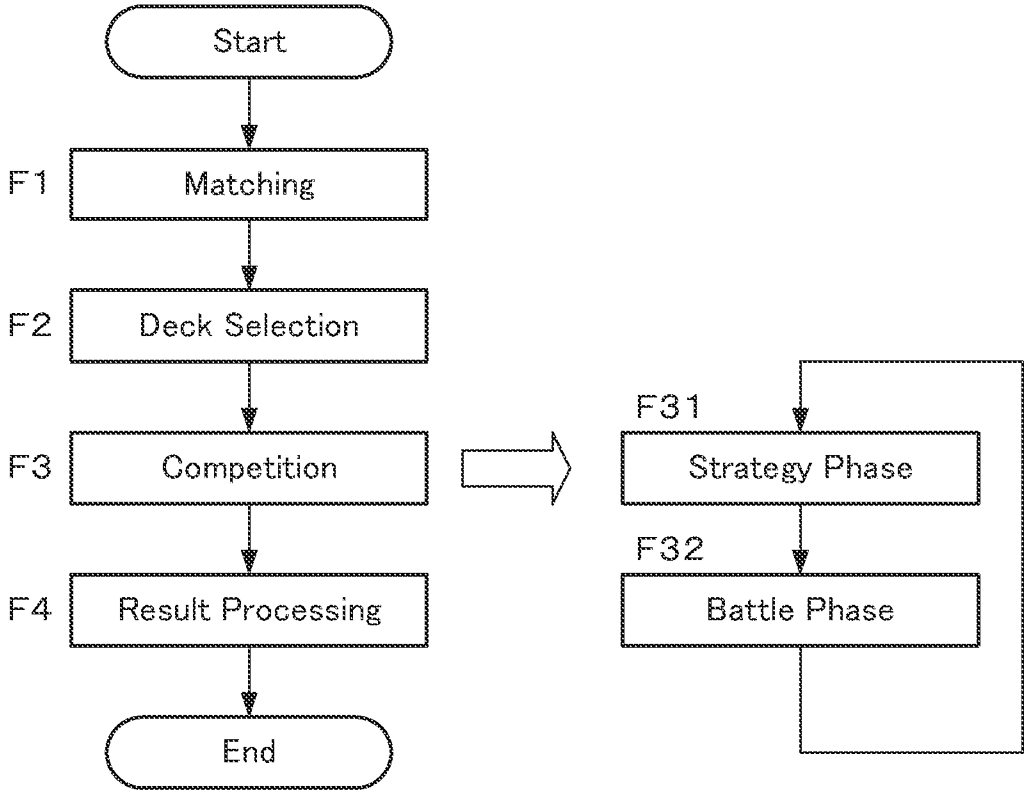
FIG. 5 shows an example of a procedure for progress in the game.

FIG. 5 shows an example of a procedure for progress in the game. The game is started with the player (real player) starting an application program for the game on the user device 3, accessing the game server 4, and completing predetermined user authentication. At the time the game is started, first, matching with other players is performed (F1). When the number of players is not enough, a computer-operated virtual player is generated as one of the opponent players. When the matching is completed, an opportunity is given for each of the matched players to select the deck 15 (F2). The selection of the deck 15 may be performed by each player selecting a predetermined number of cards 10 from the cards held by the player, or each player may be allowed to select the deck 15 to use in the game from among a plurality of types of decks 15 preconfigured.

A competition starts when the selection of the deck 15 is completed, and progress in the competition is made according to a predetermined procedure (F3). One competition is divided into a strategy phase (F31) and a battle phase (F32). One strategy phase and one battle phase are included in one turn.

The turn is repeated until a predetermined termination condition is satisfied. As an example, the termination condition is set in such a manner as to be satisfied when the parameter such as a stamina value or life set on any one player becomes equal to or less than a predetermined lower-limit value, or to be satisfied when the turn is repeated a predetermined number of times. The termination condition may be satisfied by determining that the player who becomes unable to draw a new card 10 from the deck 15 loses. When the competition is terminated, predetermined processing for the result of the game, such as processing of announcing the result of the competition or displaying an image that presents the end of the competition, is performed (F4), and then the game is terminated.

The strategy phase in the competition is a phase in which each player takes the card 10 from the hand area 16 and places the card 10 in the player's own card placement space 13. At the time the game is started, a predetermined number of (as an example, five) cards 10 are drawn from the deck 15 into the hand area 16, and each player selects an appropriate card 10 from the hand area 16 and places the card 10 in the card placement area 14, whereby the strategy phase progresses. In the second and subsequent strategy phases, the hand area 16 is refilled with as many cards 10 as a shortfall in the predetermined number from the deck 15. When the monster card 10A is placed in the monster card placement area 14A, a three-dimensional image of the monster 22 displayed on the image part 10*a* appears on the monster card 10A. The monster 22 is an attacker when the monster card 10A is placed in the longitudinal-placement form, and the monster 22 is a defender when the monster card 10A is placed in the lateral-placement form. It is left to each player's choice whether or not the card 10 is placed in each of the card placement areas 14, and a choice of placing no card 10 may also be allowed.

In any case, in the strategy phase, the card 10 is appropriately placed in the card placement area 14, according to the strategy of each player. When another player is computer-controlled, the actions, such as selecting the card 10 and placing the card 10 in the card placement area 14, are performed in accordance with a predetermined algorithm.

The strategy phase is terminated when a predetermined period of time has passed, or by all the players issuing an instruction to terminate the strategy phase. When the strategy phase is terminated, transition to the battle phase occurs. In the battle phase, first, an opportunity is given to choose whether or not to use the special card 10B. For example, when the special card 10B that can exert the effect thereof without needing to be placed in the card placement area 14 is included among the cards in the card-in-hand area 16, an opportunity to use the special card 10B is given to the player, with a period of time being limited. When the period of time for the opportunity has passed, the monster 22 as the attacker moves in the battle area 12 along the relevant line Lc. The amount of one movement is set to a half of the entire length of the line Lc. Accordingly, the monster 22 positioned in the monster card placement area 14A moves to the midpoint (a position indicated by an outlined circle in FIG. 2) of the line Lc in one movement. The monster 22 positioned at the midpoint arrives at the opponent's monster card placement area 14A. The defender monster 22 stays on the monster card placement area 14A, without moving.

With movements of the monsters 22, the monsters 22 collide with each other between the monster card placement areas 14A connected by the line Lc, in some cases. When such a collision occurs, the condition for the match between the monsters 22 is satisfied, and the match occurs. Not only at the midpoint of the line Lc, a collision also may occur at an end of the line Lc, that is, in any one of monster card placement areas 14A between which the correspondence relation is established, in some cases. For example, such a case is that an attacker monster 22 belonging to one player collides with a defender monster 22 belonging to another player on the monster card placement area 14A. Alternatively, when the speeds of movement of the monsters 22 that are to fight the match are mutually different, a collision may occur at a position other than the midpoint and the ends of the line Lc. However, occurrence of the match is not necessarily limited to the examples in which the condition for occurrence of the match is the collision of the monsters 22. As long as the monsters 22 (or the monster cards 10A) positioned between the monster card placement areas 14A between which the correspondence relation is established are selected as the combination that is to fight the match, the condition for occurrence of the match (hereinafter, also referred to as "condition for the match" in some cases) is not limited to the collision, but the condition for occurrence of the match may be appropriately changed, such as the following: for example, when a plurality of monsters 22 are positioned within a predetermined distance from each other, the match may occur between two or more monsters 22 as long as the two or more monsters 22 are positioned between the monster card placement areas 14A between which the correspondence relation is established. A concept of "between the monster card placement areas 14A" includes the respective positions of the monster card placement areas 14A located at both ends of the line Lc. However, the condition for occurrence of the match may be set based on a concept including positions on the line Lc excluding the monster card placement areas 14A. For example, if all monsters 22 are configured only as the attackers and the monster 22 appearing on the monster card placement area 14A is configured to make movement in one battle phase without exception, the match at least between the monsters 22 can be configured not to occur on the monster card placement areas 14A.

For the match between the monsters 22, the result of the match is calculated, based on the offensive power or the defensive power of the monster card 10A corresponding to each of the monsters 22 (hereinafter, referred to as the offensive power or the defensive power of the monster 22, in some cases). For the attacker monster 22, the offensive power is used for the parameter to be calculated, and for the defender monster 22, the defensive power is used for the parameter to be calculated. For the match between the attacker monsters 22, the value of the offensive power of the opponent's monster is subtracted from the value of the offensive power of each monster 22. When the value of the offensive power is decreased to a lower-limit value (as an example, zero) or less as a result of the subtraction, a scene is directed in which the monster 22 of interest is destroyed. The destroyed monster 22 disappears, and the corresponding monster card 10A is moved to the grave area 14B. For example, when the offensive power of the player's own monster 22 is 2500, and the offensive power of the opponent's monster 22 is 3000, the calculation results in −500 (=2500−3000), so that the player's own monster 22 is destroyed.

The offensive power of the opponent's monster 22 is similarly calculated, and as a result, the offensive power of the monster 22 is changed to 500 (=3000−2500). When the attacker monster 22 collides with the defender monster 22, calculation is similarly performed by using the offensive power of the attacker monster 22 and the defensive power of the defender monster 22. Processing according to the result of the calculation is also similarly performed.

The monster 22 that has survived the match undestroyed can advance to a next match. In such a case, the result of the next match is calculated based on the offensive power or the defensive power after the subtraction. When the attacker monsters 22 fight the match, or when the attacker monster 22 and the defender monster 22 fight the match, the offensive power or the defensive power of any one of the monsters 22 becomes zero or less in either case. Accordingly, once the match occurs, any one of the monsters 22 that have fought is always destroyed. Moreover, when values of the offensive power or the defensive power used in calculation are equal, the offensive power or the defensive power of both monsters 22 becomes zero as a result of the calculation. In such a case, processing may be performed assuming that both monsters 22 have been destroyed.

When the monster 22 has arrived at the monster card placement area 14A on the opponent's side, and when no monster 22 is present on the monster card placement area 14A, in other words, when the monster card 10A is not placed therein, the match occurs between the attacker monster 22 and the opponent player. For the match, calculation processing of similarly obtaining a difference as described above is performed by using the offensive power of the attacker monster 22 and the value of the parameter, such as stamina or life, set on the opponent player. However, the calculation is performed under a setting in which the attacker monster 22 attacks the player, and is performed as processing of subtracting the offensive power of the attacker monster 22 from the parameter set on the player. As to the parameter such as stamina set on the player, unlike the parameter of "offensive power" or "defensive power", neither offensive power nor defensive power, as a parameter that decreases the offensive power of the monster 22, is set on the player. Accordingly, in the match between the attacker monster 22 and the player, the value of the offensive power of the monster 22 is not decreased. When the value of the parameter of the player becomes equal to or less than a predetermined lower-limit value as a result of the calculation, the player is considered to lose the competition. By the fact that it is determined that any one player loses, the competition termination condition is satisfied, and the competition is terminated. In contrast, when the termination condition is not satisfied, the competition is repeated until the turn including the strategy phase and the battle phase is repeated a predetermined number of times as mentioned above. The termination condition may be satisfied by treating a player who becomes unable to draw the card 10 from the deck 15 as losing. Besides, when two or more players remain after one player loses, the strategy phase and the battle phase may be repeated until a predetermined number of times is reached, and the competition may be terminated when one player remains to win ultimately. When no player loses even after the turn is repeated a predetermined number of times, the competition may be terminated in a draw, or a player who has the largest parameter value at the time may be deemed as a winner.

In the above-described strategy phase, when the monster 22 has moved out of the monster card placement area 14A, a new monster card 10A can be placed in the monster card placement area 14A. Thus, a plurality of monsters 22 can be positioned on one line Lc. Here, on the line Lc, there are included the monster card placement areas 14A. For example, when a plurality of attacker monsters 22 is placed on the same line Lc, it is possible to launch the attacks in waves against the opponent's monster 22 or the opponent player. However, the amount of movement of the attacker monster 22 in one battle phase is fixed, and a subsequent monster 22 cannot catch up with or overtake a preceding monster 22. Moreover, for example, when the monster 22 falls in a non-movably state along the line Lc due to the effect of the special card 10B, the monster 22 subsequent thereto cannot go forward either and falls in a state of stopping at the same position. However, movement of each monster 22 may be controlled in such a manner that there occurs a case where the subsequent monster 22 overtakes the preceding monster 22 on the line Lc. For example, when a difference in movement speed is provided between the monsters 22 that move on the same line Lc in the same direction, overtaking may be allowed for the subsequent monster 22 in cases such as where the preceding monster 22 becomes unable to move due to the effect of the special card 10B or the like. Restriction of movement of the monster 22 by using the effect of the special card 10B may be caused in a form, for example, as follows: the monster card 10A placed in any one monster card placement area 14A for the opponent player is changed from the lateral-placement state into a longitudinal-placement state, whereby the monster 22 corresponding to the monster card 10A is changed from the attacker to the defender. In such a case, the monster 22 changed to the defender is stopped at the position where the monster 22 is present at the time on the line Lc. It may be possible to cause such a change not only in a first preceding monster 22 in the moving direction on the line Lc, but also in the second and subsequent monsters 22. With respect to the second and subsequent monsters 22, it is also possible to make any of the second and subsequent monsters 22 serve as the defender, by the player placing the corresponding monster card 10A in the monster card placement area 14A in the lateral-placement form.

The amount of movement of the monster 22 in one battle phase is not limited to the above-described example. For example, three or more stop positions may be set on the line Lc, and an advance to a next stop position may be made per movement. In such a case, the attacker monster 22 needs to experience at least two battle phases before arriving at the opponent's monster card placement area 14A. By increasing the number of stop positions, more opportunities for the monsters 22 to collide on the same line Lc can be made to arise.

Figure 6A:
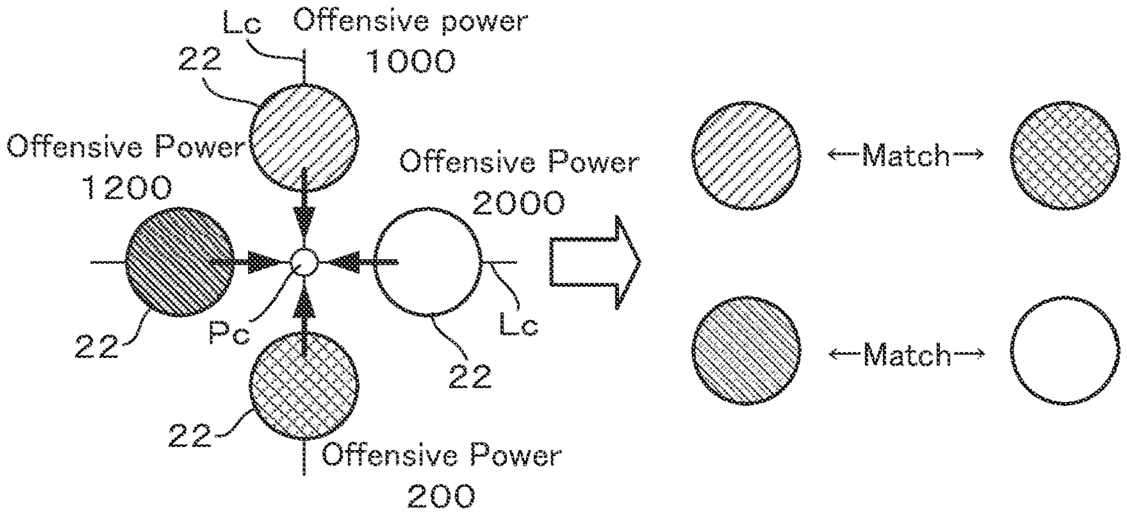
FIGS. 6A to 6C show examples of order of fighting a match when three or more monsters face each other.
Figure 6B:
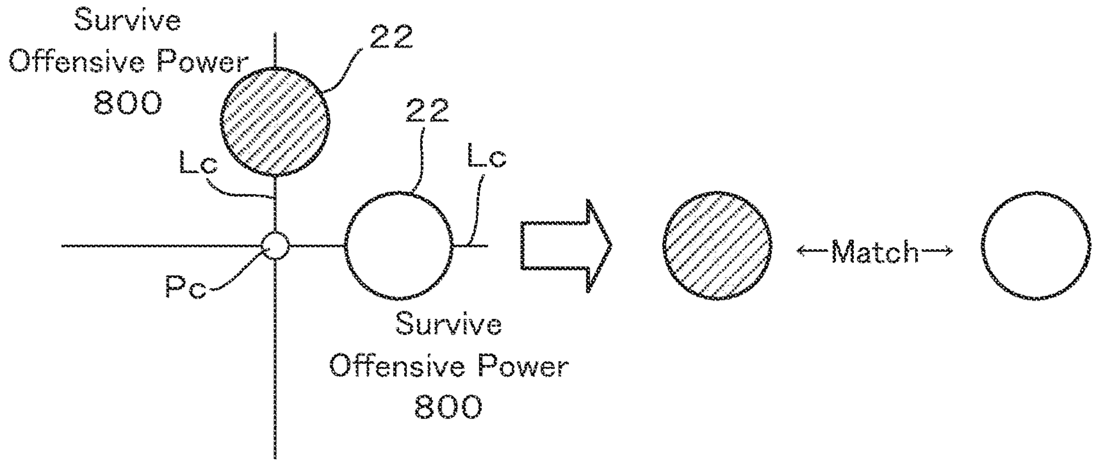
Figure 6C:
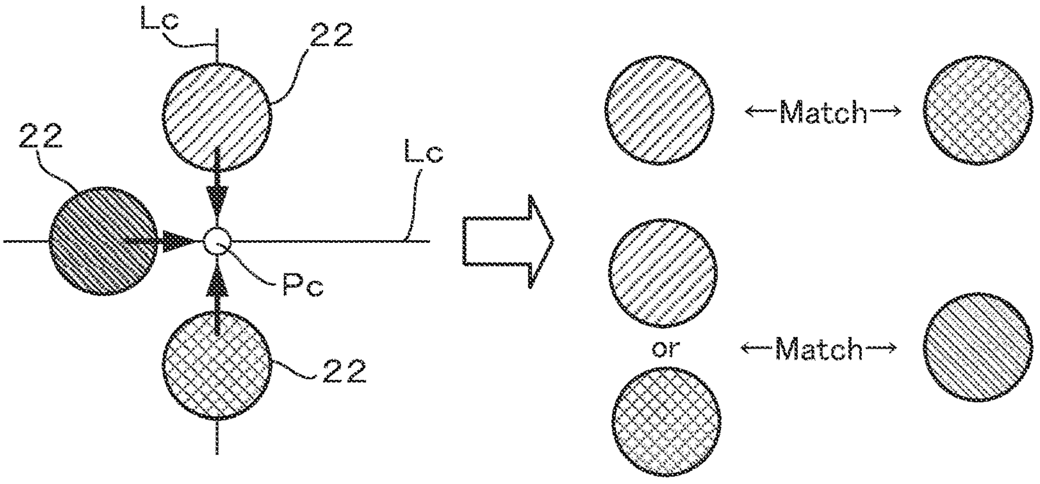

Next, with reference to FIGS. 6A to 6C, processing in a case where the monsters 22 collide at the intersection of lines Lc mentioned above is described. The processing in such a case varies, depending on whether or not the monster card placement areas 14A between which a relation of the lines Lc intersecting is established are treated as the areas where the correspondence relation to fight the match is also established therebetween. FIGS. 6A to 6C show an intersecting position Pc of the line Lc in a vertical direction connecting upper and lower monster card placement areas 14A and the line Lc in a horizontal direction connecting right and left monster card placement areas 14A in the field 11 in FIG. 2. As shown in FIG. 6A, a case is considered where four monsters 22 collide at the intersecting position Pc. As to the monsters 22 moving on the line Lc in the vertical direction, since the correspondence relation is established between the monster card placement areas 14A, the condition for the match is satisfied by a collision therebetween, and the match occurs. As for the monsters 22 moving on the line Lc in the horizontal direction, since the correspondence relation is also established between the monster card placement areas 14A, the condition for the match is satisfied by a collision therebetween, and the match occurs.

As results of the above matches, on each of the line Lc in the vertical direction and the line Lc in the horizontal direction, one monster 22 wins and survives and the other monster 22 is destroyed and disappears, as shown in FIG. 6B. In such a state, when it is considered that the correspondence relation is not established between the lines Lc in an intersecting relation, the two surviving monsters 22 may be processed in such a manner as to advance to the next position in the battle phase in the next turn, without fighting against each other. In contrast, when it is considered that the correspondence relation is also established between the lines Lc in the intersecting relation, the match is caused to occur also between the surviving monsters 22 in the battle phase in the same turn. However, such a match may be configured to be fought in the battle phase in the next turn. In such a case, movement of the monsters 22 may be processed in such a manner that the surviving monsters 22 stay at the intersecting position Pc. In any case, for the next match, a combination of monsters 22 that is to fight the match is selected with the results of the current matches taken into consideration, and in calculation of the result of the next match, the parameter values changed as the result of calculation for the current matches are used.

As described above, when a plurality of matches is caused to occur at the intersecting position Pc, only one monster 22 survives to win ultimately. However, in examples of the offensive power shown in FIGS. 6*a* and 6*b*, the offensive power of all the monsters 22 become zero or less through the two matches. Specifically, since the offensive power of the monsters 22 surviving the first matches are equally 800, both the monsters 22 are destroyed in the second match. Accordingly, all the monsters 22 are destroyed and disappear through the two matches. As described above, a case can occur where there is no surviving monster 22, depending on the values of the offensive power and the defensive power of the monsters 22.

As shown in FIG. 6C, when three monsters 22 collide at the intersecting position Pc, the match occurs between two monsters 22 moving on one of the lines Lc, and the monster 22 moving on the other line Lc wins by default. Thereafter, the match occurs between the monster 22 surviving the match and the monster 22 winning by default. However, when it is considered that there is no correspondence relation between lines Lc in the intersecting relation, in the example in FIG. 6C, the match may be caused to occur only between the monsters 22 moving on the line Lc in the vertical direction, and the monster 22 moving on the line Lc in the horizontal direction may be considered to have no opponent to fight against and caused to move forward. Besides, the direction in which the monster 22 moves is fixed, and there are no cases where the match occurs as the result of the monster 22 moving backward along the line Lc. However, such backward movement may be caused as the effect of the special card 10B. In such a case, for example, a case may occur where the monster 22 that has passed the intersecting position Pc returns to the intersecting position Pc and participates in the match.

In the above-described examples, the match is caused to occur between the monsters 22 when the monster card placement areas 14A are connected by the line Lc to establish the correspondence relation therebetween, or when it is considered, as a result of the relation of the lines Lc intersecting being established, that the correspondence relation is established between the monster card placement area 14A via the intersection between the lines Lc, with precedence given to the former relation over the latter relation. However, the order of precedence for the match is not limited to such an example, and may be decided according to an appropriate rule. For example, when three or more monsters 22 collide at the intersecting portion between the lines Lc, first, the match is caused to occur between two monsters 22 with relatively large offensive power, and then the match is caused to occur between a surviving one of the monsters 22 and the remaining monster 22, or alternatively, two monsters 22 with similar offensive power are preferentially selected. As in such examples and the like, the order of precedence may be decided from an appropriate perspective. In decision of the order of precedence, a player's operation may be taken into consideration, such as allowing the player to indicate an order of precedence for the match. Further, there may be a case where the order of precedence is decided at random, such as deciding the order of precedence by performing a lottery or the like in response to occurrence of a collision between three or more monsters 22.

In the above-described examples, at least one monster 22 is destroyed in one match. However, a further parameter such as stamina value or life may be set on each monster 22 (monster card 10A) in addition to the offensive power and the defensive power, and the parameter is decreased according to a difference in the offensive power or the defensive power, and the monster 22 may be treated as being destroyed when a resultant value is decreased to a lower-limit value or less. In such a case, an example can occur where both monsters 22 survive without being destroyed in one match. When such an example occurs, the match may be repeated in the same turn, or over a plurality of turns, until any one of the monsters 22 is destroyed, or the monsters 22 may move to pass each other in the battle phase in the next turn and an opportunity to fight against another monster 22 or a player may be occurred.

In the above description, although the monster 22 of each player is configured to fight the match following satisfaction of the condition for the match, a cooperative relation may be established for some players, and between the players having such a relation, processing for the match may be changed in such a manner that no match occurs and assistance is given in the match. For example, in the examples shown in FIGS.

6A to 6C, when three or more monsters 22 collide at the intersecting position Pc, the monsters 22 of the players in the cooperative relation do not fight the match, and the cooperative relation may be reflected in calculation for the match between the monsters 22 that are not in the cooperative relation, by applying processing of calculating a result of the match by using the offensive power of the monster 22 of one player plus the offensive power of the monster 22 of the other player in the cooperative relation with the one player.

(6) Modifications of Field

FIGS. 7 to 12 show some modifications related to the number of monster card placement areas 14A and the correspondence relations therebetween. Incidentally, in FIGS. 7 to 12, only monster card placement areas 14A are depicted, among the card placement areas 14 to be provided in each card placement space 13.

The grave area 14B, the special card placement areas 14C, and the deck area 14D depicted in FIG. 2 are similarly provided also in the modifications. Moreover, as in FIG. 2, the correspondence relation between the monster card placement areas 14A is indicated by the line Lc, and depiction of the midpoint of the line Lc is omitted.

Figure 7:
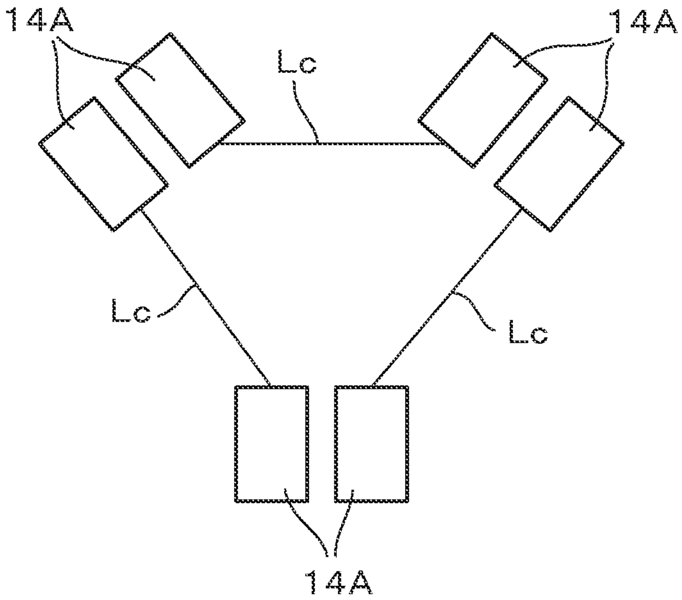
FIG. 7 shows an example of a correspondence relation between card placement areas when three people play.

FIG. 7 is an example when three players fight the match. In the example, two monster card placement areas 14A are provided in each card placement space 13, and those monster card placement areas 14A correspond to one monster card placement area 14A in each adjacent card placement space 13 one-to-one.

Figure 8:
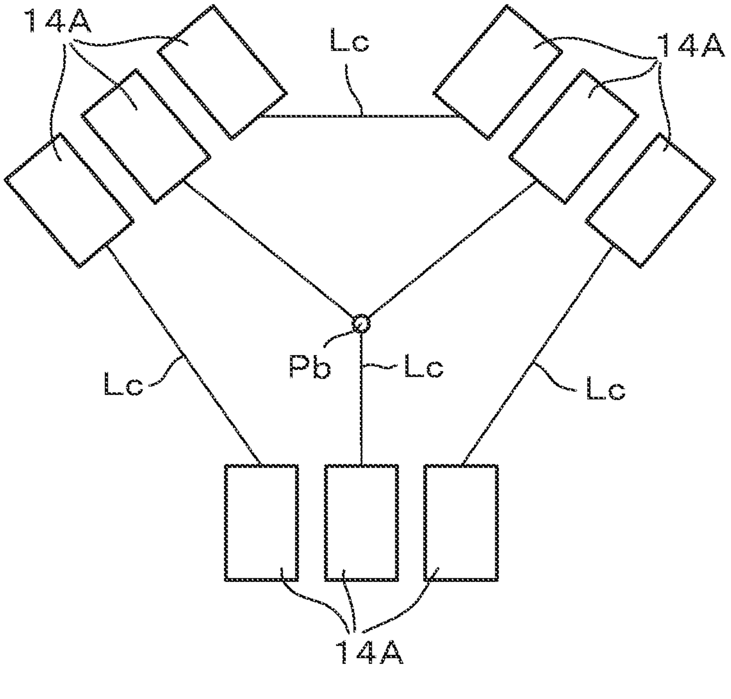
FIG. 8 shows another example of a correspondence relation between card placement areas when three people play.

FIG. 8 is another example when three players fight the match. In the example, three monster card placement areas 14A are provided in each card placement space 13. The monster card placement areas 14A on the right and left of each card placement space 13 correspond to the monster card placement area 14A on the right or left of each adjacent card placement space 13 one-to-one. On the other hand, the middle monster card placement area 14A in each card placement space 13 corresponds to the middle monster card placement areas 14A in the other two card placement spaces 13. In other words, each middle monster card placement area 14A corresponds to the other two middle monster card placement areas 14A. Thereby, one-to-multiple relations are established with respect to the middle monster card placement areas 14A. Such a correspondence relation is an example of a specific correspondence relation.

In the example in FIG. 8, each line Lc connecting the middle monster card placement areas 14A branches into two lines halfway. When the monsters 22 collide at the branching point Pb, processing may be performed as in the examples described in FIGS. 6A to 6C. Moreover, as a result of the line Lc branching, when the monster 22 advances from the middle monster card placement area 14A along the line Lc, options for an advancing direction of the monster 22 are created at the branching point Pb. In such a case, an advancing direction may be decided according to a predetermined selection condition, or an advancing direction may be selected according to an instruction from the player. The selection condition may be appropriately set, such as prioritizing the right side when viewed from the monster 22, selecting an advancing direction on a side where the monster 22 exists or on a side where the monster 22 does not exist, or selecting an advancing direction on a side where the offensive power or the defensive power of the monster 22 is smaller.

Figure 9:
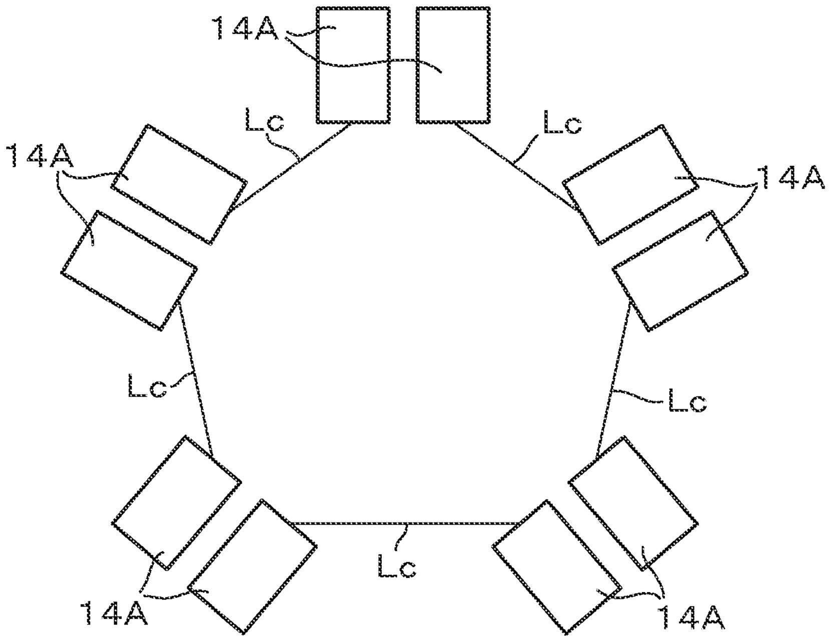
FIG. 9 shows an example of a correspondence relation between card placement areas when five people play.

FIG. 9 is an example when five players fight the match. In the example, as in the example in FIG. 7, two monster card placement areas 14A are provided in each card placement space 13, and the two monster card placement areas 14A correspond to one monster card placement area 14A in each adjacent card placement space 13 one-to-one.

Figure 10:
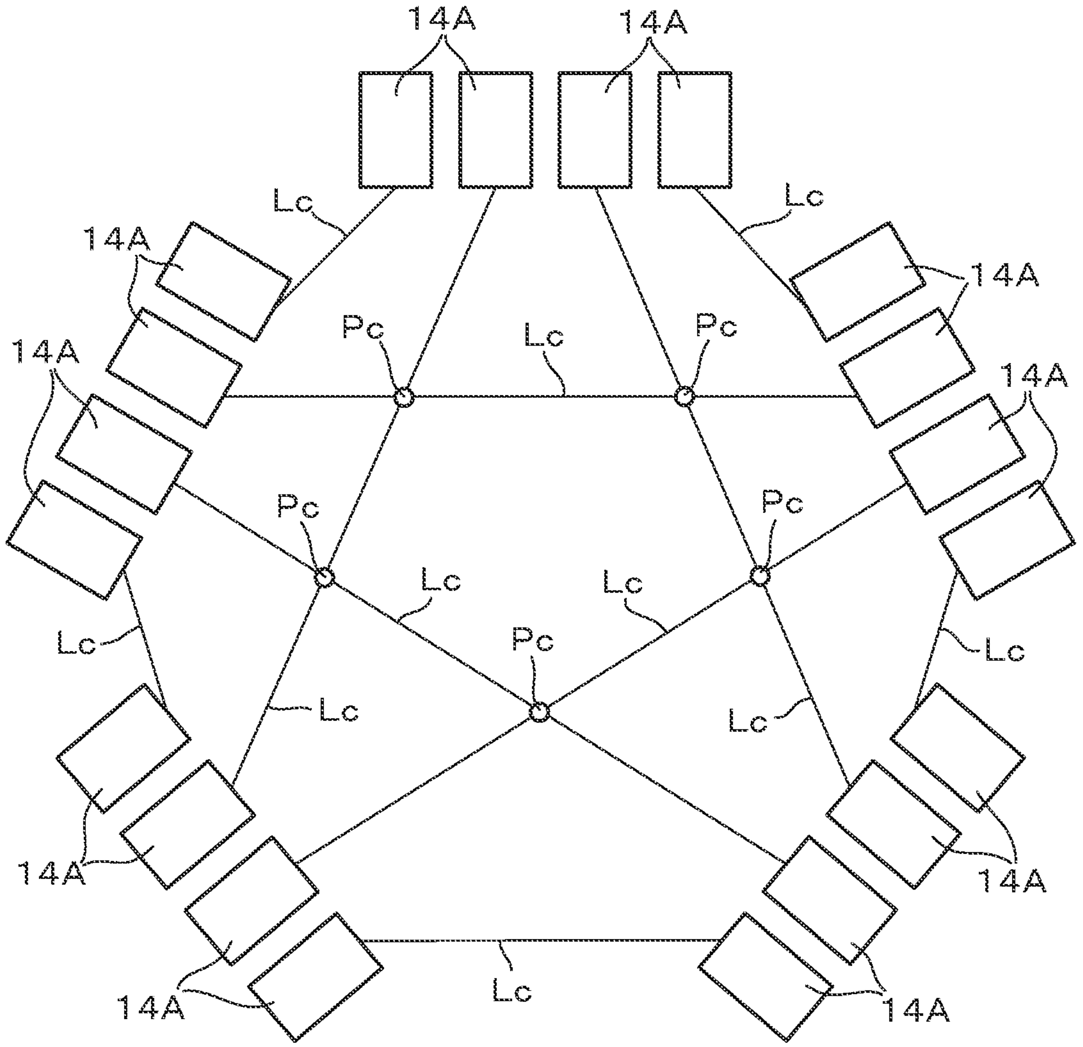
FIG. 10 shows another example of a correspondence relation between card placement areas when five people play.

FIG. 10 is another example when five players fight the match. In the example, four monster card placement areas 14A are provided in each card placement space 13. The rightmost and leftmost monster card placement areas 14A in each card placement space 13 correspond to the rightmost or leftmost monster card placement area 14A in each adjacent card placement space 13 one-to-one. The two monster card placement areas 14A in the middle of each card placement space 13 correspond to the middle-right or middle-left monster card placement area 14A in each of other two card placement spaces 13 excluding the adjacent card placement spaces 13. Accordingly, in the battle area 12, five intersecting positions Pc are created between the lines Lc. Accordingly, when the match is processed by treating that the correspondence relation is established between the monster card placement areas 14A in the relation of the lines Lc intersecting, the probability increases that monsters 22 collide and the match occurs. However, the match may be processed by treating that no correspondence relation is established between the monster card placement areas 14A in the relation of the lines Lc intersecting. When it is considered that the correspondence relation is not established between the monster card placement areas 14 in the relation of the lines Lc intersecting, the correspondence relation between the monster card placement areas 14A is one-to-one, while the correspondence relation is one-to-multiple when it is considered that the correspondence relation is established.

Figure 11:
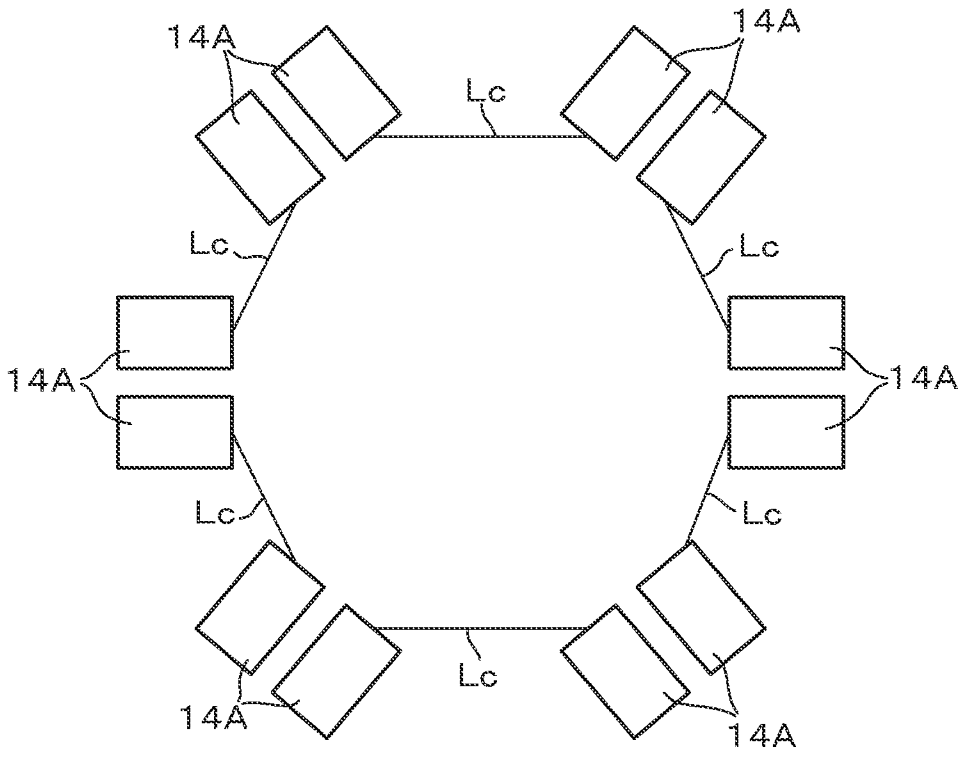
FIG. 11 shows an example of a correspondence relation between card placement areas when six people play.

FIG. 11 is an example when six players fight the match. In the example, as similar as the examples in FIGS. 7 and 9, two monster card placement areas 14A are provided in each card placement space 13, and the two monster card placement areas 14A correspond to one monster card placement area 14A in each adjacent card placement space 13 one-to-one.

Figure 12:
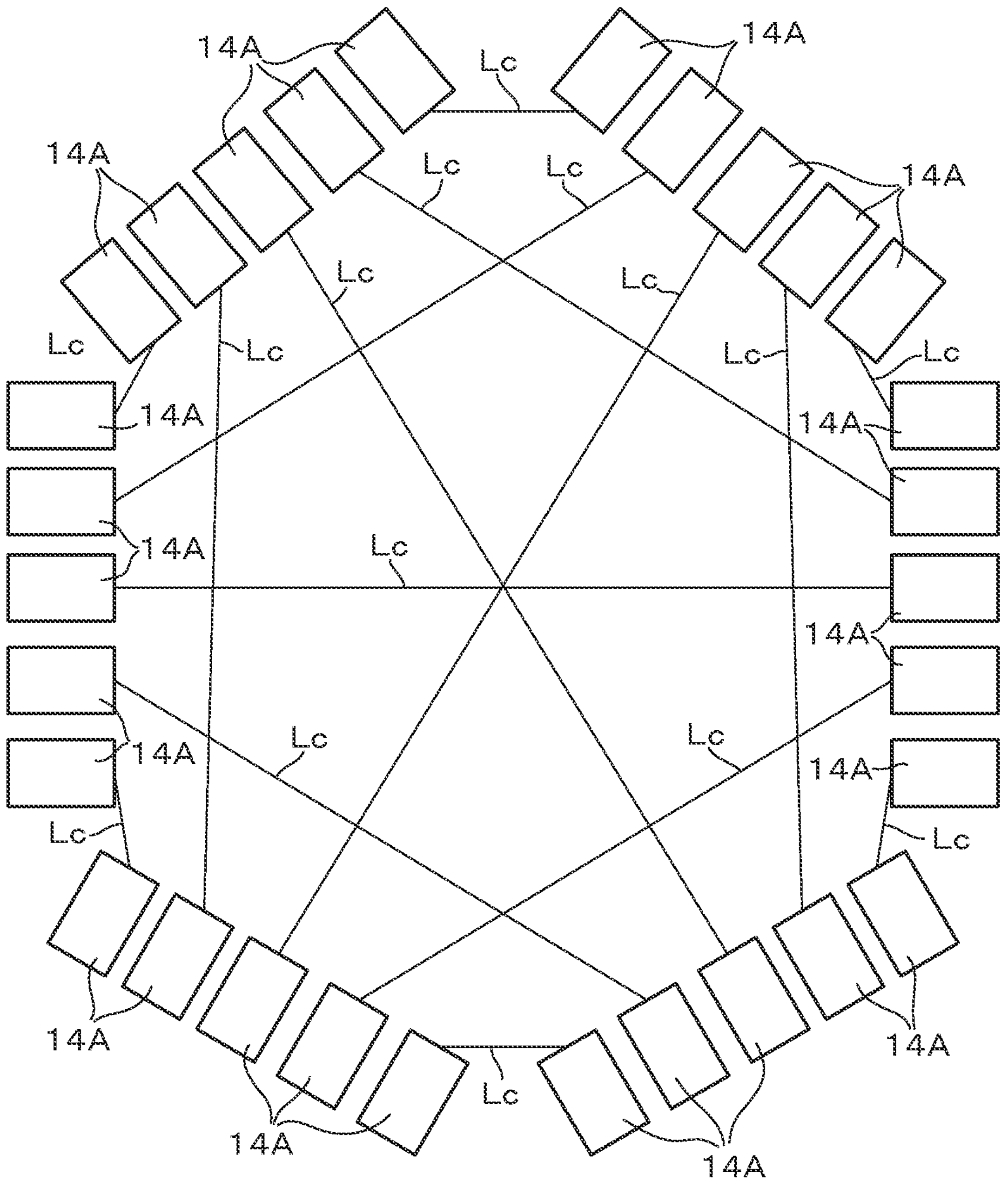
FIG. 12 shows another example of a correspondence relation between card placement areas when six people play.

FIG. 12 is another example when six players fight the match. In the example, five monster card placement areas 14A are provided in each card placement space 13. The rightmost and leftmost monster card placement areas 14A in each card placement space 13 correspond to the rightmost or leftmost monster card placement area 14A in each adjacent card placement space 13 one-to-one. The middle monster card placement area 14A in each card placement space 13 correspond to the middle monster card placement area 14A in the card placement space 13 located directly opposite. The second right and second left monster card placement areas 14A in each card placement space 13 correspond to the second right or second left monster card placement area 14A in the card placement space 13 next to each adjacent card placement space 13. In the example, in the battle area 12, twelve intersecting positions Pc are created between the lines Lc. Accordingly, when the match is processed by treating that the correspondence relation is established between the monster card placement areas 14A in the relation of the lines Lc intersecting, the probability further increases that the monsters 22 collide and the match occurs. However, the match may be processed by treating that no correspondence relation is established between the monster card placement areas 14A in the relation of the lines Lc intersecting.

When it is considered that the correspondence relation is not established between the monster card placement areas 14A in the relation of the lines Lc intersecting, the correspondence relation is one-to-one, while the correspondence relation is one-to-multiple when it is considered that the correspondence relation is established.

The numbers of the monster card placement areas 14 and the correspondence relations therebetween are examples, and various modifications can be made, apart from the depicted examples. Although the number of card placement spaces 13 need to be set according to the number of players, the number of monster card placement areas 14A in each one card placement space 13 is not limited to the depicted numbers, which are two to five. The correspondence relations, in other words, the lines Lc between the monster card placement areas 14A may be thinned out, or may be added, as appropriate. The monster card placement area 14A that corresponds to another monster card placement area 14A one-to-one and the monster card placement area 14A that corresponds to other monster card placement areas 14A one-to-multiple may coexist in each one card placement space 13. For example, in the example in FIG. 12, a modification is possible in which the number of monster card placement areas 14A is three, the correspondence relations as similar as in FIG. 11 are established for the rightmost and leftmost monster card placement areas 14A, and the middle monster card placement area 14A is set to correspond to the middle monster card placement areas 14A in all the other card placement spaces 13 one-to-multiple. Moreover, the player may be allowed to set the maximum number of people in matching when starting a play, and according thereto, the field 11 may be selected automatically, or may be selected by the player. Further, the shape of the field 11 may automatically be determined later, or may be determined later by the player, according to the number of people matched.

[Configuration of and Processing by User Device]

(1) Configuration of Control System

Figure 13:
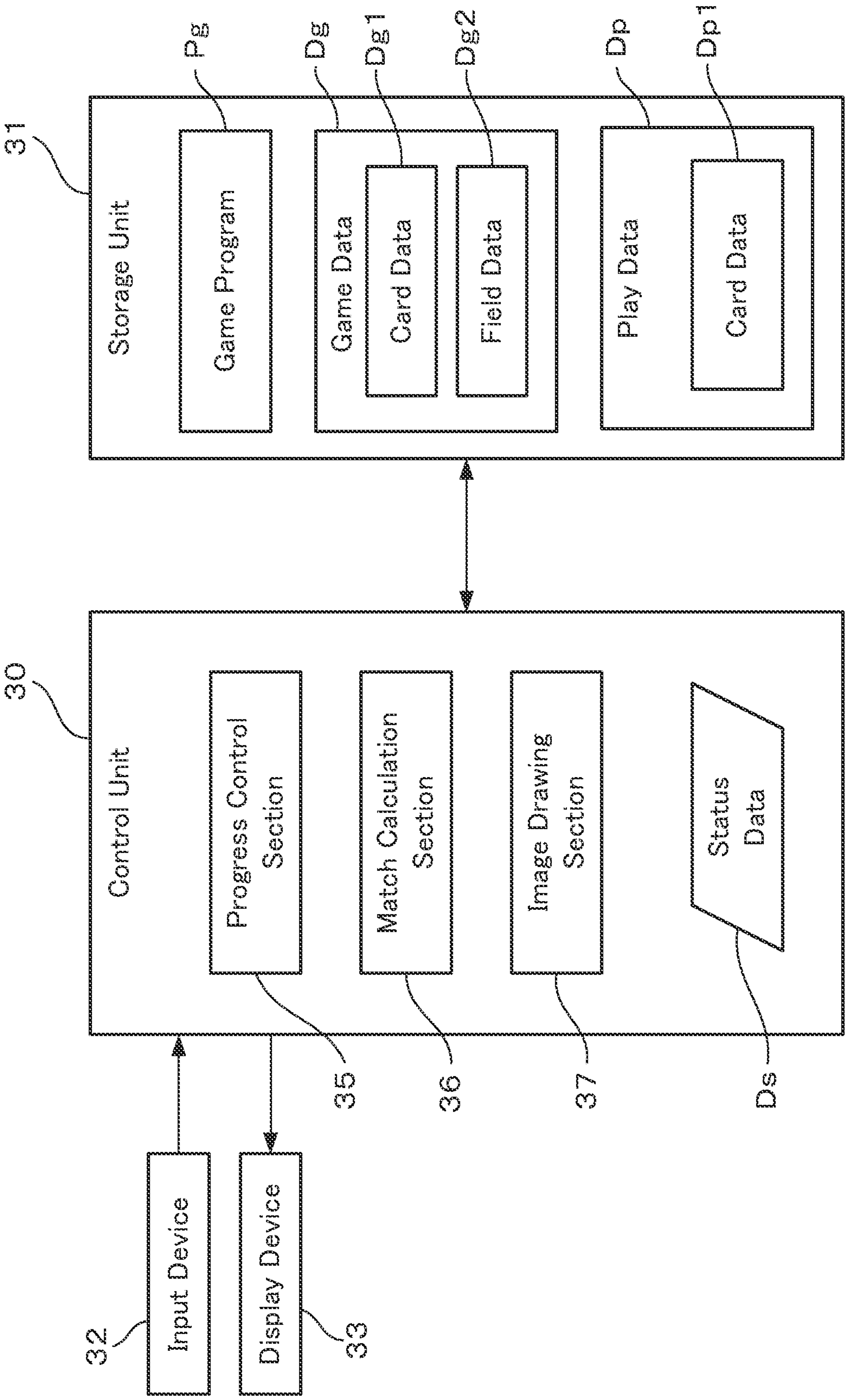
FIG. 13 is a block diagram showing an example of a configuration of a control system in the user device.

Next, a control system of the user device 3 for implementing the above-described game is described with reference to FIG. 13. As shown in FIG. 13, a control unit 30 and a storage unit 31 are provided in the user device 3. The control unit 30 is configured as a computer including a CPU and an internal storage device required for operation thereof, such as a cache memory, a RAM, or a frame memory. The storage unit 31 is a storage device using a nonvolatile storage medium, such as a magnetic storage medium or a flash memory, serving as an external storage device for the control unit 30. To the control unit 30, there are connected an input device 32 that detects a user operation and outputs an operation signal according to a result of the detection, and a display device 33 for displaying the game screen and the like. In addition, a speaker unit for outputting sound, a communication control unit for controlling communication with the game server 4, and the like are also connected to the control unit 30, but depiction thereof is omitted.

A game program Pg, game data Dg, and play data Dp are recorded in the storage unit 31. The game program Pg is an application program for causing the control unit 30 to perform calculation processing and operation control required for the game, in cooperation with an operating system that controls basic operation of the control unit 30. In the game program Pg, various information required to control the above-described game is described, such as the amount of movement of the monster 22 per movement, the condition for the match when the monsters 22 collide, the respective conditions for terminating the strategy phase and the battle phase, and the condition for terminating a competition.

The game data Dg is data to be referred to as appropriate in the control of the game. As an example, the game data Dg includes card data Dg1 and field data Dg2. The card data Dg1 is data describing contents of various cards 10. For example, described in the card data Dg1 is various information required to specify the content of the card 10, such as information specifying the monster 22 to be displayed in the image part 10*a* of the card 10, and information specifying values of the offensive power and the defensive power of the monster 22. The field data Dg2 is data describing the configuration of the field 11. For example, described in the field data Dg2 is information specifying the number and layout of the card placement spaces 13 to be provided in the field 11, the number and layout of the card placement areas 14 to be provided in each card placement space 13, and further, the correspondence relations to be established between the monster card placement areas 14A, and the like.

The play data Dp is data for each user, associated with play of the game by the user of the user device 3. For example, described in the play data Dp is information on play history and status of the user. The play data Dp includes card data Dp1. In the card data Dp1, information for determining the card 10 that is usable by the user in the game is recorded. The usable card 10 is, for example, the card 10 that is acquired by the user in the game and thus becomes able to be used in the game thereafter. When the value of the parameter, such as the offensive power or the defensive power, of the card 10 is changed according to the play of the game, information indicating a current value of the parameter may be recorded in the card data Dp1. In such a case, the value of the parameter of the card 10 in the card data Dg1 in the game data Dg may be an initial value before changed.

The above-described program Pg and the game data Dg are appropriately distributed from the game server 4 to the user device 3 and stored in the storage unit 31. The play data Dp is appropriately updated according to the play of the game on the user device 3, and is stored in the game server 4 at an appropriate timing, in association with the user's identification information. When the user completes authentication with the game server 4 when playing the game, the play data Dp corresponding to the user is provided from the game server 4 to the user device 3 and stored in the storage unit 31.

By the control unit 30 executing the game program Pg, a progress control section 35, a match calculation section 36, and an image drawing section 37 are provided in the control unit 30. Each of the sections 35 to 37 is a logical device implemented by computer hardware of the control unit 30 and the game program Pg as software cooperating with each other. The progress control section 35 is in charge of various processing required to cause the game to progress according to the procedure shown in FIG. 5. The progress control section 35 generates status data Ds for determining status of progress in the game, stores the status data Ds in the internal storage device of the control unit 30, and appropriately updates the status data Ds according to progress in the game. The status data Ds includes various information required to determine the status of the game, such as the configuration of the field 11, the layout of the cards 10 in the field 11, the positions of the monsters 22, the current values of the offensive power and the defensive power of the monsters 22, and the current value of the parameter, such as stamina, set on the player. When the match occurs between the monsters 22, the match calculation section 36 calculates the result of the match by using the values of the parameters of the monsters 22.

The image drawing section 37 repeatedly performs processing required to draw the game screen 20 according to the status data Ds in a predetermined frame memory, in a cycle according to a frame rate of the display device 33. The image drawing section 37 repeatedly draws the game screen 20, whereby the game screen 20 as illustrated in FIG. 4 is displayed on the display device 33, with contents according to progress in the game. The above-described line images 21 are included in the game screen 20.

(2) Processing by Control System

Next, processing performed by the control unit 30 in order to control the competition in the game is described with reference to FIGS. 14 to 16. The processing described below is processing that each of the user devices 3 of the players who play the game together performs, while sharing information via the game server 4. User authentication and matching (F1 in FIG. 5) may be performed in the same manner as those of various games, and a description of processing thereof is omitted.

Figure 14:
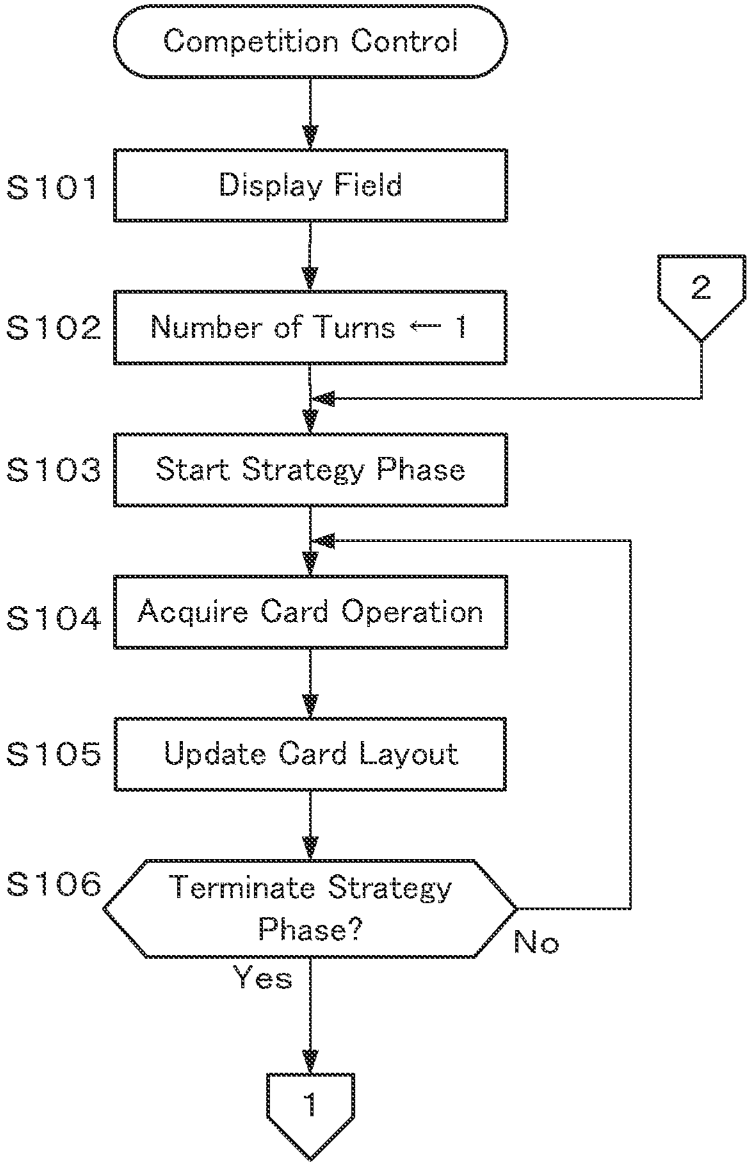
FIG. 14 is a flowchart showing an example of a procedure for match control performed by a control unit.
Figure 15:
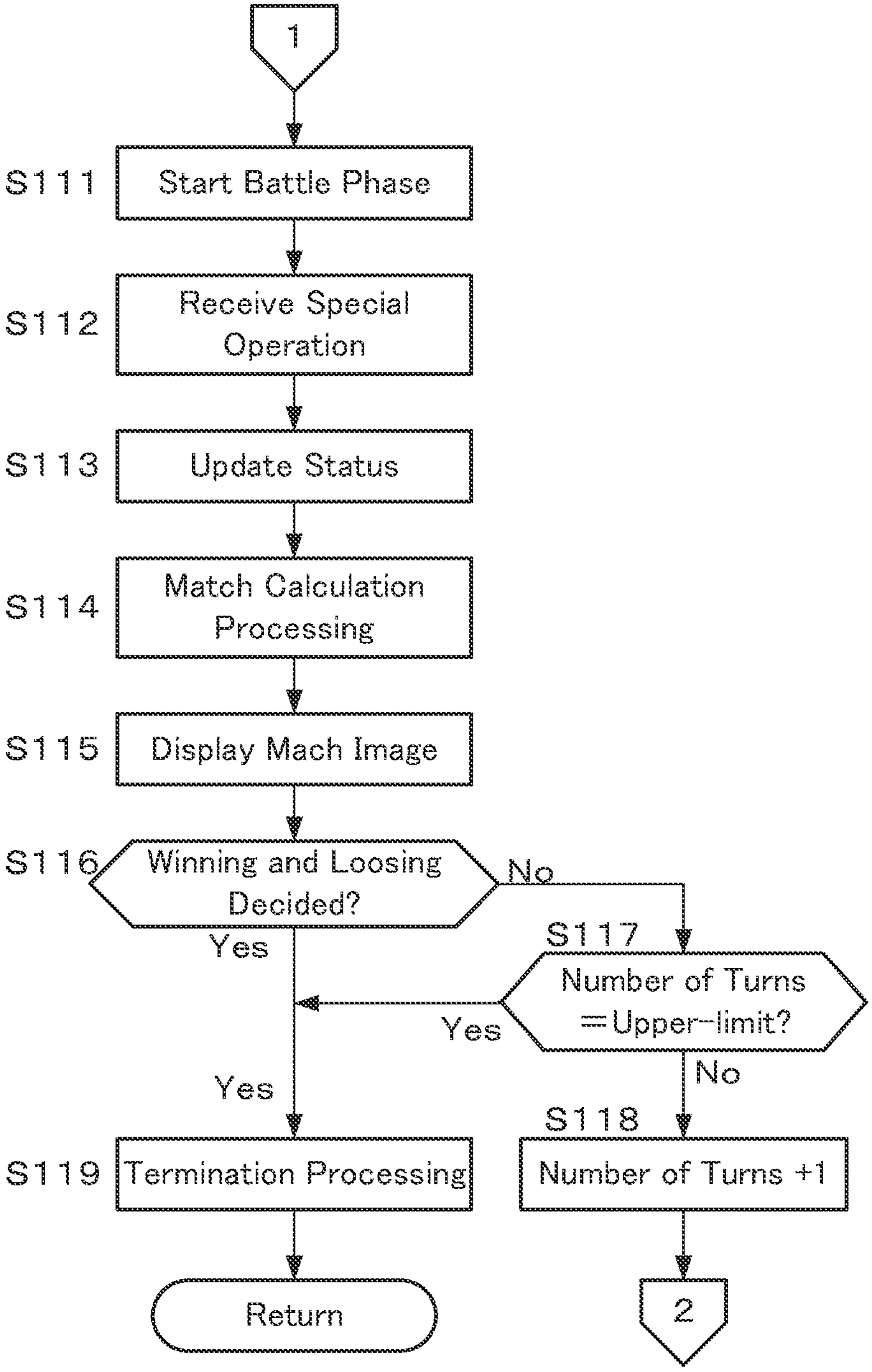
FIG. 15 is a flowchart following FIG. 14.

FIGS. 14 and 15 show an example of a procedure for competition control processing performed by the control unit 30 to implement the competition (F3) in FIG. 5. Besides, in the deck selection (F2) in FIG. 5, as described above, a predetermined number of cards 10 may be selected from the cards 10 recorded in the card data Dp1 of each player, or data on preconfigured decks 15 may be stored in the play data Dp, and the deck 15 to be used in the game may be selected from among the decks 15.

When the competition control processing in FIG. 14 is started, the image drawing section 37 of the control unit refers to the status data Ds and causes the display device 33 to display the game screen 20 including the field 11 (step S101). In the game screen 20, the line images 21 are also included as described above.

Next, the progress control section 35 of the control unit 30 sets an initial value of one, as a value for the number of turns (step S102), and subsequently starts the strategy phase (step S103).

When the strategy phase is started, the progress control section 35 acquires, via the input device 32, a player operation related to the placement of the cards 10 in the card placement areas 14 in the field 11 (also referred to as "card operation" in some cases) (step S104), and updates information on the layout of the cards 10 recorded in the status data Ds, according to the acquired card operation (step S105). The game screen 20 is updated according to the updated status data Ds, whereby the placement of the cards 10 is reflected in the game screen 20.

Subsequently, the progress control section 35 determines whether or not the condition for terminating the strategy phase is satisfied (step S106). For example, it may be determined that the strategy phase is terminated when a predetermined period of time has passed since the strategy phase was started, or when all the players issue an instruction to terminate the strategy phase. When the strategy phase is not terminated, the progress control section 35 returns to the processing in step S104. When it is determined that the strategy phase is terminated, the progress control section 35 advances to step S111 in FIG. 15, and starts the battle phase. In step S111, various direction corresponding to the start of the battle phase is made, such as causing the monsters 22 corresponding to the monster cards 10A placed in the monster card placement areas 14A to appear. Such direction may be implemented, for example, by the progress control section 35 instructing the image drawing section 37 to make direction, and the image drawing section 37, in response to the instruction, adding image for representing an event, such as the appearance of the monster 22, into the game screen 20.

When the battle phase is started, the progress control section 35 receives a special operation (step S112). The special operation is a player operation for using the special card 10B. For example, the player is given an opportunity to use the special card 10B, that can be used without needing to be placed in the card placement areas 14, among the special cards 10B included in the hand area 16. For example, reception of the special operation may be performed, with the period of time being limited. A timing to receive the special operation is not necessarily limited to the timing immediately after the battle phase is started. For example, the reception of the special operation may be always allowed during the battle phase. In such a case, the progress control section 35 may appropriately perform interrupt processing when the special operation is received. In addition, the reception of the special operation may be allowed at an appropriate timing during the battle phase.

When the reception of the special operation is terminated, the progress control section 35 updates the status data Ds, according to the layout of the cards 10 and the like at the time (step S113). In the update, processing is performed, such as causing the attacker monster 22 to advance along the line Lc by the predetermined amount of movement, or changing the states of the monster card 10A and the monster 22 according to the effect of the special card 10B, and the result of the processing is reflected in the status data Ds. The result of the reflection is also reflected in the game screen 20, by the image drawing section 37 generating the game screen based on the latest status data Ds.

After the status data Ds is updated, the progress control section 35 instructs the match calculation section 36 to calculate the result of the match (step S114). The instructed match calculation section 36 calculates the result of the match, based on the status data Ds. A procedure thereof will be described later. When the result of the match is calculated, the progress control section instructs the image drawing section 37 to generate the game screen 20 including an image that directs the match, and thus, in accordance with the instruction, the image drawing section 37 draws the image that directs the match, such as an image representing the scene of the monsters 22 fighting against each other, and causes the display device 33 to display the image (step S115).

Subsequently, the progress control section 35 determines, based on the result of the match calculated by the match calculation section 36, whether or not winning and losing between the relevant players are decided (step S116). For example, when the parameter, such as a stamina value, set on the player becomes equal to or less than the lower-limit value, such as zero, the player may be considered to lose, and winning and losing may be thus decided. Besides, when there occurs a player who becomes unable to draw the card 10 from the deck 15, the player may be considered to lose, and winning and losing may be thus decided. However, determination as to whether or not the state is that the card 10 can no longer be drawn from the deck 15 may be performed during the strategy phase. For example, it is assumed that the number of cards 10 remaining in the deck 15 for a specific player becomes zero in the strategy phase in one turn, and after the subsequent battle phase takes place, the strategy phase in the next turn is started. In such a case, since no card 10 exists in the deck 15, the specific player cannot draw the card 10. At the time, it may be determined that the player loses, and the competition may be terminated. As a modification, a rule may be set that at a time of start of the strategy phase, the cards 10 must be drawn from the deck 15 until the number of cards 10 in the hand area 16 reaches a predetermined number, and when there occurs a player who, at the time of start of the strategy phase, cannot draw the cards 10 up to the predetermined number because the cards 10 in the deck 15 are not enough, it may be determined that the player loses. When winning and losing are not decided in step S116, the progress control section 35 determines whether or not the number of turns reaches the predetermined upper-limit value (step S117), adds one to the number of turns when the upper-limit value is not reached (step S118), and then returns to the processing in step S103 in FIG. 14. Thereby, the next turn is started.

When it is determined that winning and losing are decided in step S116, or when it is determined that the number of turns reaches the upper limit in step S117, the progress control section 35 performs predetermined termination processing (step S119), and then terminates the competition control processing. For the termination processing, for example, processing of updating the play data Dp based on the result of the competition may be performed.

Figure 16:
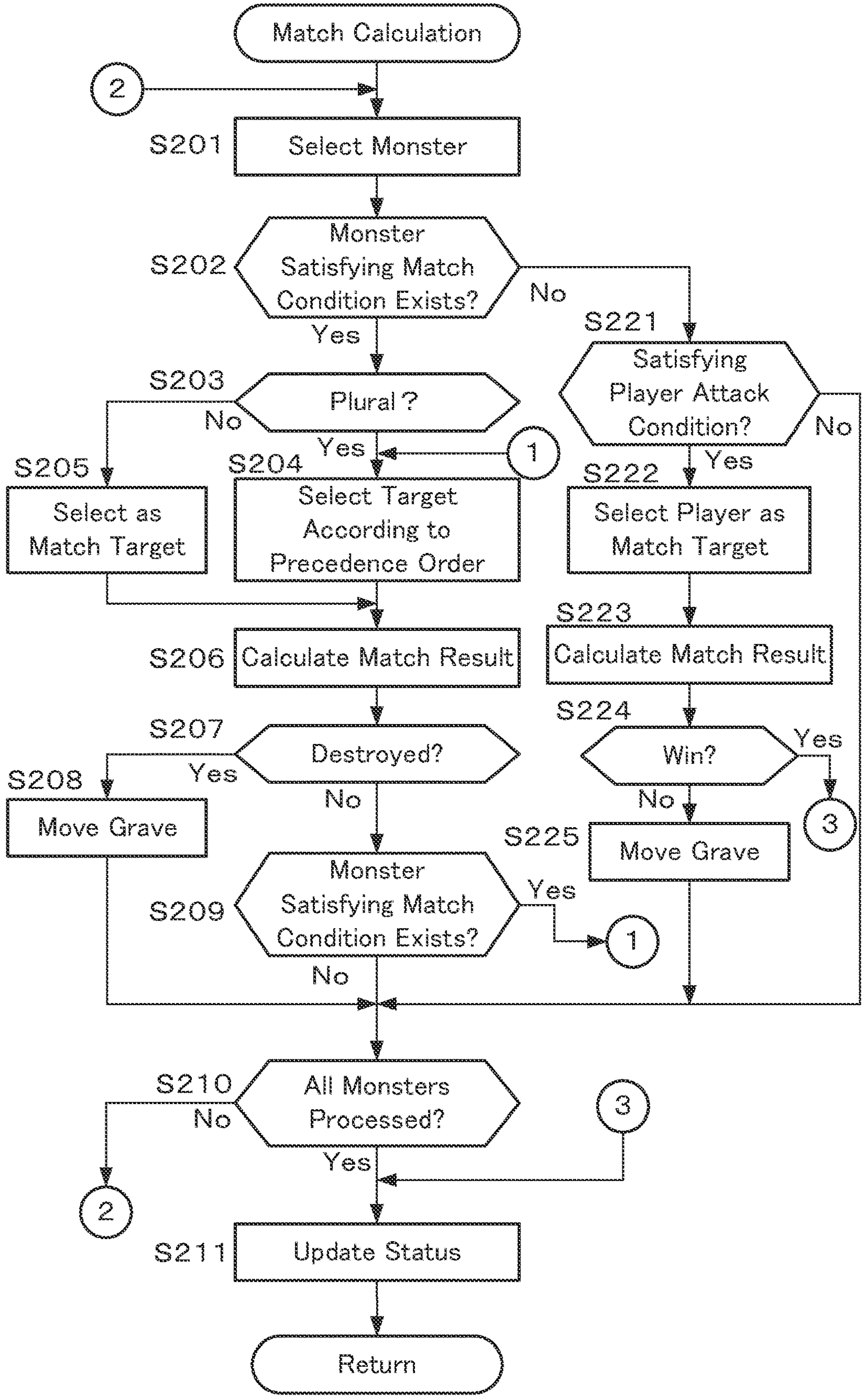
FIG. 16 is a flowchart showing an example of a procedure for match calculation processing performed by the control unit as a subroutine processing for the match control.

FIG. 16 shows an example of a procedure for a match calculation processing that is performed by the match calculation section 36 as the subroutine processing corresponding to step S114 in FIG. 15. When instructed to perform the match calculation processing, the match calculation section 36 selects the monster 22 to be a calculation target (step S201), and determines whether or not another monster 22 exists so as to satisfy the condition for the match against the selected monster 22 (step S202). The processing may be performed as processing of determining, based on the status data Ds, whether or not the monster 22 exists that collides with the selected monster 22 on the line Lc (as an example, whether or not the monster 22 exists that is determined as a hit in a hit determination processing). When it is considered that the correspondence relation is established between the monster card placement areas 14A in the relation of the lines Lc intersecting, it is also determined whether or not a collision occurs at the intersecting position Pc with the monster 22 that advances on another line Lc. When a cooperative relation is set on some players and the match is configured not to occur between the monsters 22 of the players having such a relation, presence or absence of the cooperative relation may also be taken into consideration in the determination in step S202.

When the monster 22 exists that satisfies the condition for the match, the match calculation section 36 determines whether or not a plurality of monsters 22 exists that satisfies the condition for the match (step S203), recognizes the monster 22 to be a participant in the match in accordance with the predetermined order of precedence when a plurality of monsters 22 exists, and selects the recognized monster 22 (step S204). As to the order of precedence related to the recognition of the monster 22 to be prioritized as the participant in the match, in other words, related to the selection of the monster 22, as an example, precedence may be given according to the rule shown in FIG. 6A to 6C. When a single monster 22 exists that satisfies the condition for the match in step S203, the match calculation section 36 recognizes the monster 22 as the participant in the match, and selects the recognized monster 22 (step S205). After the monster 22 to be the participant in the match is selected in step S204 or S205, the match calculation section 36 calculates the result of the match, based on the values of the offensive power or the defensive power of the monster 22 of the player of the own device and the other selected monster 22 (step S206). As described above, the calculation may be processing of selecting the offensive power, for the attacker monster 22, and the defensive power, for the defender monster 22, as the parameters to be calculated, and obtaining a difference between the selected parameters. When the effect of the special card 10B, assistance of another monster 22 based on the cooperative relation between the players, and the like are applied, such effects may be included in the calculation of the result of the match.

After the result of the match is calculated, the match calculation section 36 determines whether or not the monster 22 selected in step S201 is destroyed as the result of the match (step S207), causes the monster 22 to disappear from the field 11 when it is determined that the monster 22 is destroyed, and moves the corresponding monster card 10A to the grave area 14B (step S208). When it is determined in step S207 that the monster 22 is not destroyed, the match calculation section 36 determines whether or not, for the same monster 22, another monster 22 exists to satisfy the condition for the match (step S209). When it is determined in step S203 that a plurality of monsters 22 exists, and when there remains the monster 22 for which the result of the match is not yet calculated, then it is affirmatively determined in step S209. When it is affirmatively determined in step S209, the match calculation section 36 returns to step S204, and selects the monster 22 to be the participant in the next match, according to the order of precedence. When it is negatively determined in step S203, it is negatively determined in step S209.

When the processing in step S208 is performed, or it is negatively determined in step S209, the match calculation section 36 determines whether or not the processing in FIG. 16 is completed with respect to all the monsters 22 of the player of the own device, in other words, whether or not there exists a monster 22 that is not yet selected in step S201 (step S210). When the monster 22 of yet-to-be-elected exists, the match calculation section 36 returns to step S201, selects one unprocessed monster 22 as the calculation target, and repeats the processing in and after step S202. When it is determined in step S210 that the calculation processing is terminated with respect to all the monsters 22, the match calculation section 36 describes the result of the current calculation in the status data Ds (step S211), and then terminates the processing in FIG. 16.

When it is determined in step S202 that no monster 22 exists that satisfies the condition for the match, the match calculation section 36 determines whether or not the monster 22 selected in step S201 satisfies a condition for attack against the opponent player (step S221). It is affirmatively determined in the processing when the attacker monster 22 arrives at the monster card placement area 14A for the opponent player connected through the line Lc to move along, and when no card 10 is placed in the monster card placement area 14A.

When it is determined in step S221 that the condition for attack is satisfied, the match calculation section 36 selects the opponent player as the participant in the match (step S222), and calculates the result of the match against the player (step S223). The calculation in such a case may be performed as processing in which the offensive power of the monster 22 selected in step S201 and the parameter such as stamina set on the player selected in step S222 are set as calculation targets and a difference therebetween is calculated. Subsequently, the match calculation section 36 determines whether or not the monster 22 selected in step S201 wins (step S224). The determination may be performed by determining whether or not the parameter of the opponent player is equal to or less than a predetermined lower-limit value, such as zero, as a result of the calculation, and determining that the monster 22 wins when the parameter is equal to or less than the lower-limit value, while the monster 22 loses when the parameter is more than the lower-limit value.

When it is determined in step S224 that the monster 22 wins, the match calculation section 36 advances to the processing in step S211. The reason is that when the parameter of any one player becomes equal to or less than the lower-limit value, the competition termination condition is satisfied, with the conclusion that the player loses the competition, and calculation for the match therefore becomes unnecessary with respect to the other remaining monsters 22. However, when fighting the match continues until one player survives to win ultimately, the calculation of the result of the match may be continued by configuring the processing to advance to step S209 when it is affirmatively determined in step S224.

On the other hand, when it is not determined in step S224 that the monster 22 wins, the monster 22 is treated as being destroyed, and is caused to disappear from the field 11, and the corresponding monster card 10A is moved to the grave area 14B (step S225). Thereafter, the match calculation section 36 advances to the processing in step S210.

In the above-described processing, the image drawing section 37 serves as an example of a board face presentation unit, by displaying the game screen 20 including the line images 21 in response to the instruction in step S101 in FIG. 14, and also thereafter, repeatedly displaying the game screen 20 including the field 11. The progress control section 35 serves as an example of a placement opportunity giving unit, by acquiring the card operation in step S104 in FIG. 14, and the match calculation section 36 serves as an example of a match control unit, by performing the processing in steps S201 to S225 in FIG. 16.

As is apparent from the above description, according to the game system 1 of the present embodiment, the correspondence relations are appropriately established between the monster card placement areas 14A for each player, and the match is configured to take place only between the monster cards 10A between which the correspondence relation is established. On the other hand, it is left to each player to select what monster card 10A is placed in each monster card placement area 14A. Accordingly, it is possible to moderately restrain complexity in selection related to a combination of participants in the match, while ensuring a reasonable degree of freedom related to strategies for the match. Thus, it is possible to increase interest of the game, by moderately avoiding complexity, while ensuring amusement characteristics of the game.

In each card placement space 13, provided are not only the monster card placement areas 14A where the monster card 10A is to be placed that can be a participant in the match, but also the grave area 14B, the special card placement areas 14C, and the deck area 14D are provided that do not directly participate in the match, and that are not correlated to the card placement area 14 in another card placement space 13. Accordingly, in comparison to a case where only monster cards 10A to be participants in the match are placed in the card placement space 13, it is possible to cause a change in progress in the game, thereby moderately increasing room for selection related to strategies for the game. For example, it is possible to use the special card 10B to exert an effect on the match, or to affect use or nonuse of the card 10 through revival of the card 10 from the grave area 14B or the like.

The present invention is not limited to the above-described embodiment, and may be implemented in embodiments with various modifications or changes applied. For example, although a description is given of both of a case where the correspondence relation between the monster card placement areas 14 are limited to one-to-one and a case where the correspondence relations include a one-to-multiple relation in the above-described embodiment, the correspondence relation may be limited to one-to-one, or only one-to-multiple relation may be established. Although a one-to-multiple correspondence relation occurs in both of a case where it is considered that the correspondence relation is established also between the monster card placement areas 14 in the relation of the lines Lc intersecting, and a case where one monster card placement area 14A is connected to two or more monster card placement areas 14A by lines Lc (as an example, FIG. 8), a one-to-multiple correspondence relation may be set solely in any one of the cases.

Although the monster 22 is moved in each turn and the condition for occurrence of the match is set in connection with such movements in the above-described embodiment, such setting is not an essential requirement in the present invention. The condition for occurrence of the match may be set more simply, for example, as follows: when the monster card 10A is placed in the strategy phase in each of the monster card placement areas 14A between which the correspondence relation is established, then the match occurs between the monster cards 10A in the following battle phase. It is not always necessary to cause an element, such as a monster 22, corresponding to the card 10 to appear in the game screen 20. When a character, a piece, or the like is used for a gaming medium, a modification is also possible in which such gaming media themselves are configured to move.

Although a description is given of the example in which the processing in FIGS. 14 to 16 is performed by each user device 3 while sharing information via the game server 4, part or all of the processing may be performed by the game server 4, and each user device 3 may be configured to serve as a remote input-output device for the game server 4. Alternatively, an embodiment may be configured in which a user device 3 to serve as a host is selected from among the user devices 3 of matched players, and the host user device 3 performs the processing in FIGS. 14 to 16 while acquiring player operation information from the other user devices 3, and distributes the result of the processing to the other user devices 3. In any case, a computer that performs the processing for providing the game may be a communication information terminal device such as the user devices 3, may be a server device such as the game server 4, or may be a computer device implemented by a combination thereof. Besides, when all the other players fighting against a user of one user device 3 are computer-controlled virtual players, it is also possible for only the single user device 3 to accomplish control of the game. In such a case, the presence of the game server 4 and the other user devices 3 is not essential, and it is also possible to configure the game system 1 by using only the single user device 3.

Various aspects of the present invention respectively derived from the above-described embodiment and modifications are described below. Incidentally, in the following description, for easier understanding of each aspect of the present invention, constituent elements are supplemented with corresponding constituent elements in parentheses that are depicted in the accompanying drawings, but the present invention is not limited thereby to the depicted forms.

A game system according to one aspect of the present invention is a game system (1) comprising a computer (30) for providing a game in which each of three or more players fights a match by using gaming media (10, 10A, 10B), and a parameter affecting a result of the match is set on each of the gaming media, wherein the computer is configured to serve as: a board face presentation unit (37, S101) configured to present, to each of the players via a predetermined display device (33), a board face (11) on which a media placement space is provided for each player, the media placement space (13) including a plurality of placement areas (14, 14A, 14B, 14C, 14D) where the gaming media are to be placed, and a correspondence relation is established between one placement area (14A) in each media placement space and one placement area (14A) in at least one of the other media placement spaces, the board face being presented in a form in which the correspondence relation is perceivable; a placement opportunity giving unit (35, S104) configured to give each player an opportunity to place each of the gaming media in each placement area; and a match control unit (36, S201 to S225) configured to recognize, as participants in the match, the gaming media positioned between the placement areas between which the correspondence relation is established, to calculate the result of the match between the gaming media based on each of the parameters of the gaming media that are the participants in the match, and to change the parameters of the gaming media according to a result of the calculation.

A control method of a game system according to one aspect of the present invention is a control method of a game system (1) comprising a computer (30) for providing a game in which each of three or more players fights a match by using gaming media (10, 10A, 10B), and a parameter affecting a result of the match is set on each of the gaming media, wherein the control method causes the computer to execute: a procedure (S101) for presenting, to each of the players via a predetermined display device (33), a board face (11) on which a media placement space (13) is provided for each player, the media placement space including a plurality of placement areas (14, 14A, 14B, 14C, 14D) where the gaming media are to be placed, and a correspondence relation is established between one placement area (14A) in each media placement space and one placement area (14A) in at least one of the other media placement spaces, the board face being presented in a form in which the correspondence relation is perceivable; a procedure (S104) for giving each player an opportunity to place each of the gaming media in each placement area; and a procedure (S201 to S225) for recognizing, as participants in the match, the gaming media positioned between the placement areas between which the correspondence relation is established, calculating the result of the match between the gaming media based on each of the parameters of the gaming media that are the participants in the match, and changing the parameters of the gaming media according to a result of the calculation.

A non-transitory storage medium according to one aspect of the present invention is a non-transitory storage medium storing a computer program (Pg) applied to a game system (1) comprising a computer (30) for providing a game in which each of three or more players fights a match by using gaming media (10, 10A, 10B), and a parameter affecting a result of the match is set on each of the gaming media, wherein the computer program is configured to cause the computer to serve as: a board face presentation unit (37, S101) configured to present, to each of the players via a predetermined display device (33), a board face (11) on which a media placement space (13) is provided for each player, the media placement space including a plurality of placement areas (14, 14A, 14B, 14C, 14D) where the gaming media are to be placed, and a correspondence relation is established between one placement area (14A) in each media placement space and one placement area (14A) in at least one of the other media placement spaces, the board face being presented in a form in which the correspondence relation is perceivable; a placement opportunity giving unit (35, S104) configured to give each player an opportunity to place each of the gaming media in each placement area; and a match control unit (36, S201 to S225) configured to recognize, as participants in the match, the gaming media positioned between the placement areas between which the correspondence relation is established, to calculate the result of the match between the gaming media based on each of the parameters of the gaming media that are the participants in the match, and to change the parameters of the gaming media according to a result of the calculation.

According to the aspects, a correspondence relation is established between one placement area existing in the media placement space for each player and at least one placement area in the card placement space for another player, and the board face is presented to each player in such a manner that the correspondence relation is perceivable. Gaming media positioned between the placement areas between which the correspondence relation is established are recognized as participants in a match, and the result of the match is calculated.

Accordingly, each player is allowed to easily and surely perceive the relation between which gaming medium placed in which placement area is to fight against which gaming medium of another player. Therefore, it is possible to restrain complexity related to strategy selection of what gaming medium should be placed in which placement area, while ensuring a reasonable degree of freedom related to the strategy selection. Thus, it is possible to increase interest of the game, by avoiding complexity, while adequately ensuring amusement characteristics of the game.

Besides, the computer program according to one of the aspects of the present invention may be provided in a state of being stored in a storage medium. When such a storage medium is used, for example, the computer program according to the present invention is installed into the computer and executed thereon, whereby the game system of the present invention can be implemented by using the computer. The storage medium storing the computer program may be a non-transitory storage medium such as CDROM.

In the aspects, the board face presentation unit may present the correspondence relation to the player by causing the display device to display an image element (21) that allows the player to perceive a line (Lc) connecting the placement areas between which the correspondence relation is established. Thus, by making the player visualize the line connecting the placement areas, it is possible to allow the player to easily and surely perceive the correspondence relation between the placement areas.

The correspondence relation may be configured in such a manner that only a one-to-one relation is established, by making one placement area in one media placement space limitedly correspond to one placement area in one other media placement space. Since the placement areas correspond each other one-to-one, it is possible to avoid complexity of the correspondence relation, and to allow the player to perceive the correspondence relation more easily and surely.

The correspondence relation may be configured in such a manner as to include a specific correspondence relation in which a one-to-multiple relation is established (as an example, the correspondence relation between the middle placement areas 14 in FIG. 8), by making one placement area in one media placement space correspond to one placement area in each of at least two other media placement spaces, and when the gaming media are positioned between the placement areas between which the specific correspondence relation is established, the match control unit preferentially may select, as the participants in the match, the gaming media positioned between the placement area in any one of the media placement spaces and the placement area in one of the other media placement spaces, and may calculate the result of the match. Thus, by allowing the correspondence relation of one-to-multiple relation, it is possible to add reasonable diverseness, for combinations of the gaming media that are to be the participants in the match. Accordingly, it is possible to increase the degree of freedom in the strategy selection related to placement of the gaming medium, to an extent that excessive complexity does not arise.

The match control unit may recognize that the correspondence relation is not established between specific placement areas between which a relation of each line intersecting is established, and may exclude the gaming media positioned between the specific placement areas from targets of calculation of the result of the match. When a media placement space is configured for each of three or more players and the corresponding relations is appropriately configured between the placement areas in the media placement spaces, there may occur, as a result of that, a case where lines each connecting placement areas having the correspondence relation, intersect with each other. In such a case, when the placement areas, between which the relation of the lines intersecting is established, are treated as placement areas with no correspondence relation, it is possible to limit combinations of the placement areas between which the correspondence relation is established, without being affected by intersection of the lines, and to allow the player to relatively easily perceive the combination of the gaming media that are to be the participants in the match.

The match control unit may recognize that the correspondence relation is also established between specific placement areas between which a relation of each line intersecting is established, and may calculate the result of the match with the gaming media positioned between the specific placement areas being included into the participants in the match. In such a case, when the correspondence relation is also established for the relation of the lines intersecting, one placement area is allowed to correspond to other placement areas in such a manner as to have a one-to-multiple relation. Thus, it is possible to moderately diversify combinations of placement areas between which the correspondence relation is established, and to adequately increase the degree of freedom in the strategy selection related to placement of the gaming medium in the placement area.

When the correspondence relation is established between each pair of the placement areas in three or more media placement spaces due to establishment of the relation of the line intersecting, the match control unit may preferentially select, as the participants in the match, the gaming media positioned between the placement area in one of the media placement spaces and the placement area in one of the other media placement spaces, and may calculate the result of the match. In such a case, for the combination of the gaming media that are to be the participants in the match, any one-to-one combination is preferentially selected, while the one-to-multiple relation is created between the placement areas. Accordingly, it is possible to avoid complexity in the match, and to allow the player to relatively easily understand the contents of the match.

The match control unit may calculate the result of the match for the preferentially selected gaming media, and thereafter, may select the gaming media that are to be participants in a next match taking the result of the calculation into consideration, and may calculate the result of the next match. In such a case, when the correspondence relation of one-to-multiple relation is established between the placement areas, it is possible to cause the matches to sequentially occur, by causing a match to occur preferentially between any one-to-one combination of the gaming media, selecting, according to the result of the match, a combination of the gaming media that is to fight the next match, and calculating the result of the next match. Accordingly, it is possible to allow the player to further easily understand the contents of the matches.

Each card placement space may include a placement area (14A) to which the correspondence relation is established, and a placement area (14B, 14C, 14D) to which the correspondence relation is not established. Thus, while a gaming medium to be a participant in the match is placed in the placement area to which the correspondence relation is established, a gaming medium prepared for another use or purpose is placed in the placement area to which the correspondence relation is not established, whereby it is possible to cause the latter gaming medium to serve as an element that affects progress in the game. Thus, it is possible to make types of gaming media diverse to thereby increase diverseness and the degree of freedom related to the strategy selection, without impairing the operation and effect of avoiding complexity related to the combinations of the gaming media that are to be the participants in the match.

The invention claimed is:

1. A game system comprising a computer for providing a game in which each of three or more players fights a match by using gaming media, and a parameter affecting a result of the match is set on each of the gaming media, wherein the game system further comprises a storage device which stores field data describing a configuration of a board face on which a media placement space is provided for each player, the media placement space including a plurality of placement areas where the gaming media are to be placed, and the field data including information for specifying a correspondence relation which is established between one placement area in each media placement space and one placement area in at least one of the other media placement spaces, and wherein the computer is configured to serve as:

a board face presentation unit configured to present, to each of the players via a predetermined display device, the board face in a form in which the correspondence relation is perceivable, by referring to the field data;

a placement opportunity giving unit configured to give each player an opportunity to place each of the gaming media in each placement area; and a match control unit configured to recognize, as participants in the match, the gaming media positioned between the placement areas between which the correspondence relation is established on the basis of the field data, to calculate the result of the match between the gaming media based on each of the parameters of the gaming media that are the participants in the match, and to change the parameters of the gaming media according to a result of the calculation.

2. The game system according to claim 1, wherein the board face presentation unit presents the correspondence relation to the player by causing the display device to display an image element that allows the player to perceive a line connecting the placement areas between which the correspondence relation is established.

3. The game system according to claim 1, wherein the correspondence relation is configured in such a manner that only a one-to-one relation is established, by making one placement area in one media placement space limitedly correspond to one placement area in one other media placement space.

4. The game system according to claim 1, wherein the correspondence relation is configured in such a manner as to include a specific correspondence relation in which a one-to-multiple relation is established, by making one placement area in one media placement space correspond to one placement area in each of at least two other media placement spaces, and when the gaming media are positioned between the placement areas between which the specific correspondence relation is established, the match control unit preferentially selects, as the participants in the match, the gaming media positioned between the placement area in any one of the media placement spaces and the placement area in one of the other media placement spaces, and calculates the result of the match.

5. The game system according to claim 2, wherein the match control unit recognizes that the correspondence relation is not established between specific placement areas between which a relation of each line intersecting is established, and excludes the gaming media positioned between the specific placement areas from targets of calculation of the result of the match.

6. The game system according to claim 2, wherein the match control unit recognizes that the correspondence relation is also established between specific placement areas between which a relation of each line intersecting is established, and calculates the result of the match with the gaming media positioned between the specific placement areas being included into the participants in the match.

7. The game system according to claim 6, wherein when the correspondence relation is established between each pair of the placement areas in three or more media placement spaces due to establishment of the relation of the line intersecting, the match control unit preferentially selects, as the participants in the match, the gaming media positioned between the placement area in one of the media placement spaces and the placement area in one of the other media placement spaces, and calculates the result of the match.

8. The game system according to claim 7, wherein the match control unit calculates the result of the match for the preferentially selected gaming media, and thereafter, selects the gaming media that are to be participants in a next match taking the result of the calculation into consideration, and calculates the result of the next match.

9. The game system according to claim 1, each card placement space includes a placement area to which the correspondence relation is established, and a placement area to which the correspondence relation is not established.

10. A control method of a game system including a computer for providing a game in which each of three or more players fights a match by using gaming media, and a parameter affecting a result of the match is set on each of the gaming media, wherein the control method includes a step for storing, in a storage device of the game system, field data describing a configuration of a board face on which a media placement space is provided for each player, the media placement space including a plurality of placement areas where the gaming media are to be placed, and the field data including information for specifying a correspondence relation which is established between one placement area in each media placement space and one placement area in at least one of the other media placement spaces, and wherein the control method causes the computer to execute:

a procedure for presenting, to each of the players via a predetermined display device, the board face in a form in which the correspondence relation is perceivable by referring to the field data;

a procedure for giving each player an opportunity to place each of the gaming media in each placement area; and a procedure for recognizing, as participants in the match, the gaming media positioned between the placement areas between which the correspondence relation is established on the basis of the field data, calculating the result of the match between the gaming media based on each of the parameters of the gaming media that are the participants in the match, and changing the parameters of the gaming media according to a result of the calculation.

11. A non-transitory storage medium storing a computer program applied to a game system comprising a computer for providing a game in which each of three or more players fights a match by using gaming media, and a parameter affecting a result of the match is set on each of the gaming media, wherein the game system further comprises a storage device which stores field data describing a configuration of a board face on which a media placement space is provided for each player, the media placement space including a plurality of placement areas where the gaming media are to be placed, and the field data including information for specifying a correspondence relation which is established between one placement area in each media placement space and one placement area in at least one of the other media placement spaces, and wherein the computer program is configured to cause the computer to serve as:

a board face presentation unit configured to present, to each of the players via a predetermined display device, the board face on which a media placement space is provided for each player, the media placement space including a plurality of placement areas where the gaming media are to be placed, and a correspondence relation is established between one placement area in each media placement space and one placement area in at least one of the other media placement spaces, the board face being presented in a form in which the correspondence relation is perceivable;

a placement opportunity giving unit configured to give each player an opportunity to place each of the gaming media in each placement area; and a match control unit configured to recognize, as participants in the match, the gaming media positioned between the placement areas between which the correspondence relation is established on the basis of the field data, to calculate the result of the match between the gaming media based on each of the parameters of the gaming media that are the participants in the match, and to change the parameters of the gaming media according to a result of the calculation.

* * * * *